United States Patent
Masazumi et al.

(10) Patent No.: US 6,331,884 B1
(45) Date of Patent: *Dec. 18, 2001

(54) METHOD OF MAKING A LIQUID CRYSTAL DEVICE

(75) Inventors: Naoki Masazumi, Amagasaki; Nobuyuki Kobayashi, Kobe; Masakazu Okada, Kyoto; Kiyofumi Hashimoto; Takuji Hatano, both of Suita, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,495

(22) Filed: Jul. 14, 1998

(30) Foreign Application Priority Data

Jul. 18, 1997 (JP) .................................................. 9-193488

(51) Int. Cl.⁷ .................................................. G02F 1/1339
(52) U.S. Cl. .................................... 349/156; 349/154
(58) Field of Search .................................... 349/154, 189, 349/157, 187, 89, 155; 359/40

(56) References Cited

U.S. PATENT DOCUMENTS

| | | | |
|---|---|---|---|
| 3,578,844 | 5/1971 | Kettering et al. | 349/21 |
| 4,362,771 * | 12/1982 | Umeda et al. | 349/157 |
| 4,725,517 * | 2/1988 | Nakanowatari | 349/187 |
| 5,371,617 * | 12/1994 | Mitsutake et al. | 359/40 |
| 5,437,811 | 8/1995 | Doane et al. | 252/299.01 |
| 5,511,591 * | 4/1996 | Abe | 349/189 |
| 5,535,026 * | 7/1996 | Fujimori et al. | 349/89 |
| 5,593,615 * | 1/1997 | Nerad et al. | 349/89 |
| 5,621,553 * | 4/1997 | Nishiguchi et al. | 349/156 |
| 5,668,651 * | 9/1997 | Yamada et al. | 349/156 |
| 5,737,050 * | 4/1998 | Takahara et al. | 349/122 |
| 5,771,084 * | 6/1998 | Fujimori et al. | 349/156 |
| 5,875,013 * | 2/1999 | Hiroshi | 349/110 |

FOREIGN PATENT DOCUMENTS 7-028039     1/1995   (JP) .

OTHER PUBLICATIONS

SID 95 Digest Technical Paper, "13.2: Multicolor Reflective Cholesteric Displays" L.–C. Chien et al, 1995, pp. 169–171.

* cited by examiner

Primary Examiner—William L. Sikes
Assistant Examiner—Dung Nguyen
(74) Attorney, Agent, or Firm—Sidley Austin Brown & Wood

(57) ABSTRACT

A method of making a liquid crystal device having a plurality of cells of liquid crystal material, includes the steps of: (a) preparing a first base having a first surface; (b) providing a first phase of a material and a plurality of second phases of at least one liquid crystal material on the first surface, said second phases being spatially dispersed in a first prescribed pattern; (c providing a second base having a second surface, the second surface being substantially in contact with the first and second phases; and (d) solidifying the material of the first phase. The liquid crystal cells are formed of the dispersed liquid crystal materials. The plurality of second phases may include at least a group of liquid crystal materials which exhibits a cholesteric characteristic having a selective reflection wavelength in the visible range and a group of liquid crystal materials which exhibits a cholesteric characteristic having a different selective reflection wavelength in the visible range.

52 Claims, 8 Drawing Sheets

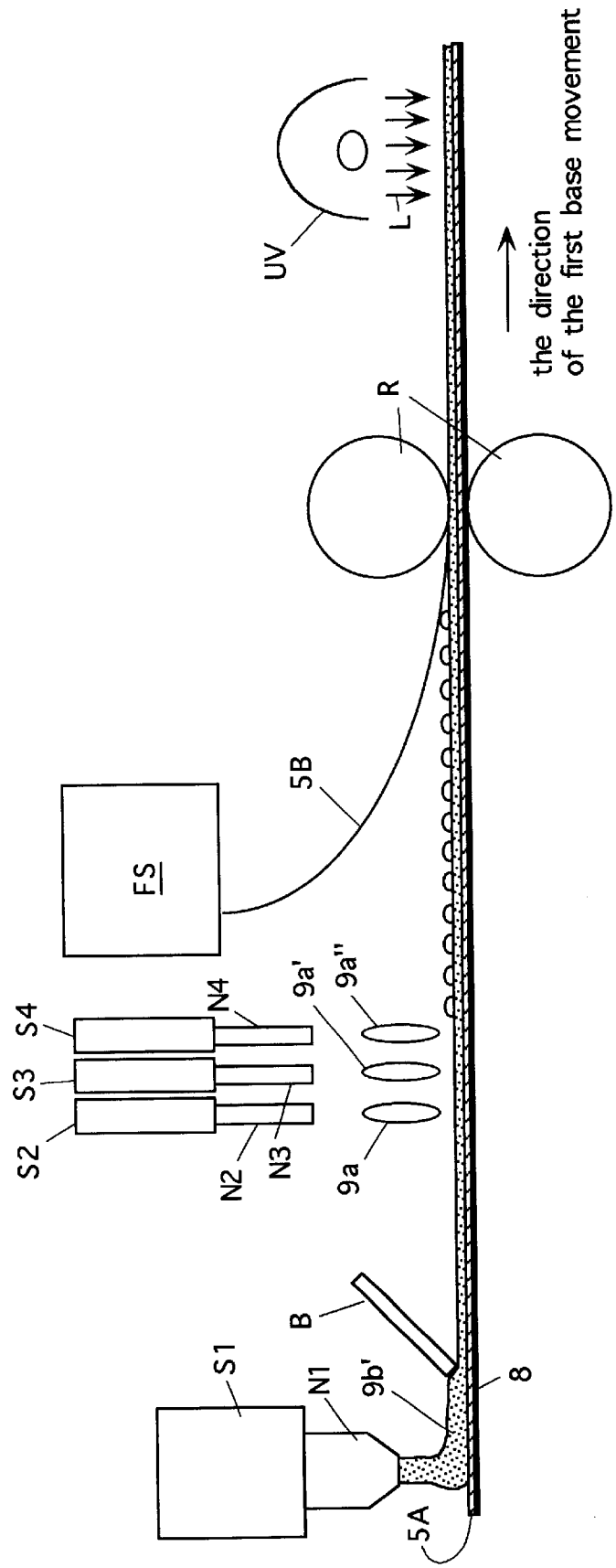

METHOD OF MAKING A LIQUID CRYSTAL DEVICE

This application is based on Japanese application No. 9-193488, the contents of which is hereby incorporated by reference.

FIELD OF THE INVENTION

The present invention relates to a method of making a liquid crystal device which uses liquid crystal material for displaying or recording images and others.

BACKGROUND OF THE INVENTION

Various kinds of liquid crystal devices having a memory effect have been proposed.

U.S. Pat. No. 3,578,844 has disclosed a liquid crystal device in which a cholesteric liquid crystal material capsulated by a polymer compound such as gelatin or gum arabi is held between a pair of bases. According to the disclosure, this liquid crystal device has a memory effect, and attains a predetermined display state when a voltage is applied thereto, and this display state will be stably maintained even after stopping the application of a voltage. This is liquid crystal device performs the display based on a difference in quantity of reflected light, which is caused by applying the voltage to change the orientation state of cholesteric liquid crystal material having a selective reflection wavelength in a visible range.

The above liquid crystal device having the composite layer or film, which includes the polymer material and the cholesteric liquid crystal material, does not require a polarizer because it utilizes selective reflection of incident light by the liquid crystal material. Therefore, it is capable of bright display of the reflection type. Further, high-resolution display can be performed by simple matrix driving without using a memory element such as a TFT or an MIM.

The liquid crystal device of the reflection type utilizing the selective reflection of the cholesteric liquid crystal material changes the display state by selectively attaining the planar orientation and the focal conic orientation. In the planar orientation, helical axes of the liquid crystal molecules forming each domain are perpendicular to the base. In the focal conic orientation, the helical axes of the liquid crystal molecules forming each domain are irregularly directed or substantially parallel to the base.

FIGS. 7(A) and 7(B) schematically show an example of a conventional liquid crystal device having a composite layer, which includes a polymer material and a liquid crystal material exhibiting a cholesteric-characteristic.

In this liquid crystal device, a composite layer 3 is retained between a pair of transparent bases or plates 1a and 1b opposed to each other. Transparent conductive films 2a and 2b are formed on inner surfaces of the bases 1a and 1b, respectively. The composite layer 3 is made of, e.g., a mesh structure 3b of resin and a liquid crystal material 3a filling a space in the resin structure 3b. A black light absorbing layer 4 is arranged on the outer side of the transparent base 1b. The liquid crystal material 3a exhibits a cholesteric characteristic, and displays a predetermined color by reflecting the light of the selective reflection wavelength corresponding to the helical pitch length when it is in a planar orientation shown in FIG. 7(A), if the selective reflection wavelength is in the visible range. In the focal conic orientation shown in FIG. 7(B), it displays the background color, i.e., black. If the helical pitch length is relatively long, e.g., in such a case that the selective reflection wavelength is in an infrared range, the liquid crystal material 3a reflects the light in the infrared range to exhibit a transparent appearance when it is in the planar orientation shown in FIG. 7(A), and exhibits an opaque appearance when it is in the focal conic orientation shown in FIG. 7(B). Accordingly, this liquid crystal device can perform the mono-color display between the selective reflection color (planar orientation) and the background color (focal conic orientation) or between the background color (planar orientation) and white (focal conic orientation). For driving this liquid crystal device, a predetermined pulse voltage is applied across the conductive films 2a and 2b from a power source (not shown) for switching the state of the liquid crystal material 3a between the planar orientation and the focal conic orientation.

For attaining a multi-color display by the liquid crystal device having the composite layer which includes the resin and the liquid crystal material exhibiting the cholesteric characteristic, the liquid crystal device may have a layered structure including multiple composite layers which are layered together and can attain the planar orientations exhibiting different colors, respectively. An example of the liquid crystal device of the multi-layer type is shown in FIG. 8. The structure of the liquid crystal device shown in FIG. 8 was devised by the inventors and others during development of the invention.

This liquid crystal device includes three composite layers 3A, 3B and 3C, each of which is held between a pair of transparent bases or plates. These layers 3A, 3B and 3C reflect visible rays of different wavelengths and thereby exhibit different colors, respectively, when they are in the planar orientation. The composite layer 3A is held between the transparent bases 1A and 1B which are provided with transparent conductive films 2A and 2B opposed to the layer 3A, respectively. The composite layer 3B is held between the transparent bases 1B and 1C which are provided with transparent conductive films 2C and 2D opposed to the layer 3B, respectively. The transparent base 1B is commonly used for holding the composite layers 3A and 3B, and the transparent conductive films 2B and 2C are arranged on the opposite surfaces thereof, respectively. The composite layer 3C is held between the transparent bases IC and 1D, which are provided with transparent conductive films 2E and 2F opposed to the layer 3C, respectively. The transparent base 1C is commonly used for holding the composite layers 3B and 3C, and carries the transparent conductive films 2D and 2E on its opposite surfaces, respectively. A black absorbing layer 4' is arranged on the outer side of the transparent base 1D.

The composite layers 3A, 3B and 3C are formed of resin structures 3bA, 3bB and 3bC of, e.g., mesh forms, and liquid crystal materials 3aA, 3aB and 3aC filling the spaces in the resin matrixes 3bA, 3bB and 3bC, respectively. Liquid crystal materials 3aA, 3aB and 3aC exhibit red, green and blue appearances when they are in the planar orientation, respectively, and exhibit transparent appearances when they are in the focal conic orientation. FIG. 8 shows the liquid crystal materials 3aA, 3aB and 3aC in the planar orientation.

The transparent conductive films 2A–2F form electrodes, each of which takes the form of a matrix, and forms pixels with respect to the corresponding composite layer.

When driving this liquid crystal device, the display states of the composite layers 3A, 3B and 3C are individually controlled by controlling application of voltages from the power source (not shown) across the transparent conductive films 2A and 2B, across transparent conductive films 2C and 2D, and across the transparent conductive films 2E and 2E, respectively. Thereby, the display in multiple colors and, more specifically, eight colors including black can be performed on a predetermined pixel.

However, the following disadvantages arise when performing the multi-color display by the liquid crystal device of the above layered type.

First, all the composite layers are set to the focal conic orientation to attain transparent states so as to perform black display. In this case, a large quantity of incident light is reflected by the base surfaces and thus the degree of transparency lowers because the bases arranged between the viewer side and the black light absorbing layer are large in number. Consequently, the contrast is liable to be low.

Secondly, relative positioning between the respective pixels is difficult when overlaying the transparent bases provided with the transparent conductive films on each other.

Thirdly, the device is heavy and difficult to handle due to increase in number of the bases.

The above disadvantages can be avoided and further the multi-color display can be performed, if the liquid crystal device has the single composite layer, which is held between the paired bases, as is done in the liquid crystal device shown in FIG. 7, and is formed of the pixels capable of display in red, green and blue.

A photo-tunable method has been proposed as a method of manufacturing such a liquid crystal device. In the photo-tunable method, a nematic liquid crystal material and a tunable chiral material (TCM) added thereto are used as a liquid crystal material exhibiting the cholesteric characteristic. This tunable chiral material exhibits various chiralities depending on the degree of exposure to ultraviolet rays. According to the photo-tunable method, an assembly of a pair of bases, at least one of which is transparent, and a spacer disposed therebetween is prepared. The bases are provided with electrodes opposed to each other. A space between the bases is filled with a solution of liquid crystal material exhibiting cholesteric characteristic and resin monomer in compatibility state. Then, the assembly is radiated with ultraviolet rays to cure the resin monomer. This radiation with ultraviolet rays is performed through a filter for controlling the degrees of exposure of respective portions. Thereby, the liquid crystal materials in the respective portions of the composite layer have different helical pitch length and thus different selective reflection wavelengths. Therefore, the liquid crystal device can display different colors on the respective portions when the liquid crystal material is in the planar orientation.

According to the photo-tunable method, however, the base pair holding the compatible solution, which contains the resin precursor and the liquid crystal material, is entirely radiated with the ultraviolet rays for controlling the helical pitch length of liquid crystal material in the respective portions and for polymerization and phase separation of the resin. Therefore, it is impossible to control the position where the resin structure is formed, and the liquid crystal region in the produced composite layer has a continuous form. Consequently, the liquid crystal materials having different selective reflection wavelengths flow and will be gradually mixed with each other so that the multi-color display will not be performed stably. Further, the selective reflection wavelength depends on the degree of exposure to the ultraviolet rays so that the selective reflection wavelength of the produced liquid crystal device may change over time.

SUMMARY OF THE INVENTION

An object of the invention is to provide a method of making a liquid crystal device which can prevent mixture of liquid crystal materials neighboring to each other.

Another object of the invention is to provide a method of making a liquid crystal device which can stably perform a multi-color display.

For achieving the above objects, the inventors have earnestly made a study, and have found that a liquid crystal device including liquid crystal materials each arranged in a region isolated by a partition can be made by employing the following manners (1), (2) and (3).

(1) A material such as resin precursor, which can be hanged from a liquid or fluid state into a solid state, is used as partitioning material for forming independent liquid crystal regions.

(2) A combination of the material in the liquid or fluid state and the liquid crystal material is selected such that they are not compatible with each other at a temperature during the making of the liquid crystal device.

(3) The above material and the liquid crystal material are disposed at predetermined positions between paired bases. In other words, the material is disposed at a position where the partition is to be formed, and the liquid crystal material is disposed at other positions. Thereafter, the material is cured, e.g., by radiating the whole structure with ultraviolet rays.

The invention has been developed based on the above findings, and an aspect of the invention provides a method of making a liquid crystal device having a plurality of cells of liquid crystal material (the first method of the invention), comprising the steps of:

(a) preparing a first base having a surface;

(b) providing a first phase of a material and a plurality of second phases of at least one liquid crystal material on said surface, said second phases being spatially dispersed in a first prescribed pattern; and (c) solidifying the material of said first phase.

The liquid crystal cells are formed by the dispersed second phases.

The first method of the invention may further include the step of (d) providing a second base on the surface carrying said first and second phases. This step (d) may be executed after said step (b) and before said step (c).

In the first method of the invention, the first and second bases may be provided with electrodes for forming electrodes in a matrix form.

In this case, the second phases are dispersed to positions corresponding to pixels defined by the electrodes in the matrix form during said step (b) so that a partition can be formed by solidifying said first phase material in another and thus non-display region during said step (c).

The material of said first phase may be typically a pre-polymer material. In this case, the pre-polymer material may be solidified by polymerization during said step (c). Depending on the kind of the pre-polymer material, the polymerization may be performed by radiation of said prepolymer material with ultraviolet light, heating of the prepolymer material or the like.

For the multi-color display, said plurality of second phases may include at least a first group of the second phases and a second group of the second phases. Each of said second phases in said first group may have a first liquid crystal material, and each of said second phases in said second group may have a second liquid crystal material different in characteristic from said first liquid crystal material. The first and second liquid crystal materials may be liquid crystal materials exhibiting cholesteric characteristic, in which case the first liquid crystal material in a planar state reflects light of a first wavelength, and the second liquid crystal material in a planar state reflects light of a second wavelength different from said first wavelength. Two kinds of the light of the first and second wavelengths different from each other may be visible light.

For preventing mixing of the material of the first phase and the liquid crystal material of the second phase during manufacturing of the liquid crystal device, a combination of the material of the first phase and the liquid crystal material of the second phase may be selected not to have compatibility.

In the method of the invention, the step (b) may include the steps of (b1) spreading the material of said first phase uniformly on said surface of the first base; and (b2) dispersing the liquid crystal material of said second phases on said first phase.

The step (b2) may be executed by dropping a plurality of droplets of said liquid crystal material. For dropping extremely fine droplets required for a high-resolution display, an ink jet head may be used for dropping the droplets of the liquid crystal material. Each of the droplets of the liquid crystal material desirably has a diameter of 500 $\mu$m or less.

Instead of the above, said step (b) may include the steps of (b1) dispersing the material of said first phase on said surface of the first base in a second prescribed pattern; and (b2) dispersing the liquid crystal material of said second phases on said surface in the first prescribed pattern.

The step (b1) may be executed by dropping a plurality of droplets of said material. The step (b2) may be executed by dropping a plurality of droplets of said liquid crystal material. In this case, ink jet heads may likewise be used for dropping the droplets. Each of the droplets desirably has a diameter of 500 $\mu$m or less.

Another aspect of the invention provides a method of forming a pillar between two liquid crystal cells (second method of the invention), comprising the steps of:

(a) preparing a first base having a surface;

(b) providing, on said surface, two droplets of a liquid crystal material and providing a material on at least a portion between said droplets of the liquid crystal material; and (c) solidifying said material to form a pillar.

The above second method of the invention may further include the step of (d) providing a second base on the surface carrying said droplets of the liquid crystal material and said material. This step (d) may be executed after said step (b) and before said step (c).

In the second method of the invention, the first and second bases may be provided with electrodes for forming electrodes in a matrix form. In this case, one of said liquid crystal droplets may be supplied to a position corresponding to the pixel defined by the electrodes in the matrix form during said step (b), and the other liquid crystal droplet may be supplied to a position corresponding to a pixel neighboring to said pixel during said step (b) so that the pillar is formed in a non-display region corresponding to the position between said pixels during said step (c).

Said material may be a pre-polymer material. In this case, the pre-polymer material may be solidified by polymerization during said step (c). Depending on the kind of the pre-polymer material, the polymerization may be performed by radiation of said pre-polymer material with ultraviolet light, heating of the pre-polymer material or the like.

For the multi-color display, the first liquid crystal material included in one of said liquid crystal droplets and the second liquid crystal material included in the other of said liquid crystal droplets may be different in characteristic from each other. The first and second liquid crystal materials may be liquid crystal materials exhibiting cholesteric characteristic, in which case the first liquid crystal material in a planar state reflects light of a first wavelength, and the second liquid crystal material in a planar state reflects light of a second wavelength different from said first wavelength. Two kinds of the light of the first and second wavelengths different from each other may be visible light.

For preventing mixing of said material and said liquid crystal material during manufacturing of the liquid crystal device, a combination of them may be selected to prevent compatibilizing.

In the second method of the invention, the step (b) may include the steps of (b1) providing a layer of the material; (b2) dropping one of the droplets of the liquid crystal material to a first position on said layer of the material; and (b3) dropping the other of said droplets of the liquid crystal material to a second position on said layer of the material while spacing the second position from said first position.

Alternatively, the step (b) may include the steps of (b1) dropping one of said droplets of the liquid crystal material to a first position on said surface; (b2) dropping the other of said droplets of the liquid crystal material onto a second position on said surface while spacing the second position from said first position; and (b3) dropping a droplet of the material to a third position between said first and second positions on said surface.

For dropping extremely fine droplets required for a high-resolution display, an ink jet head may be used for dropping the droplets. Each of the droplets desirably has a diameter of 500 $\mu$m or less.

The foregoing and other objects, features, aspects and advantages of the present invention will become more apparent from the following detailed description when taken in conjunction with the accompanying drawings.

BRIEF DESCRIPTION OF THE DRAWINGS

FIG. 5 is a schematic view illustrating the making of a liquid crystal device by yet another embodiment of the method of the present invention;

DESCRIPTION OF THE PREFERRED EMBODIMENTS

Figure 1A:
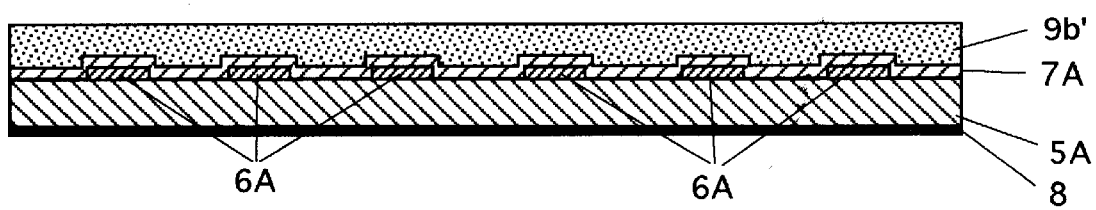
FIGS. 1(A), 1(B), and 1(C) are cross-sectional views illustrating a method of making a liquid crystal device of one embodiment of the present invention.

According to the invention, a method of making a liquid crystal device having a plurality of cells of liquid crystal material, includes the steps of:

(a) preparing a first base having a surface;

(b) providing a first phase of a material and a plurality of second phases of at least one liquid crystal material on said surface, said second phases being spatially dispersed in a first prescribed pattern; and (c) solidifying the material of said first phase.

The liquid crystal cells are formed by the dispersed second phases.

The method may further include the step of (d) providing a second base on the surface carrying said first and second phases.

The method of making the liquid crystal device of the invention will be described below more in detail and, for this purpose, description will now be given on the following first example.

FIRST EXAMPLE

In this method of making the liquid crystal device, a pair of bases are used, and resin precursor is applied onto the first base. Droplets of a liquid crystal material are dropped or applied to dispersed positions on the resin precursor applied surface, i.e., the surface carrying the resin precursor. The second base is arranged on the resin precursor and the liquid crystal material for holding the resin precursor and the liquid crystal material between the first and second bases. The resin precursor is cured to form a resin partition. Thereby, such a liquid crystal device is completed that a composite layer including the resin partition and the liquid crystal material is held between the first and second bases.

The liquid crystal material may typically be a liquid crystal material which exhibits cholesteric characteristic at a service environment temperature (room temperature). The liquid crystal material exhibiting cholesteric characteristic may be, for example, a cholesteric liquid crystal material or a chiral nematic liquid crystal material made of a nematic liquid crystal material and a chiral ingredient added thereto for providing an intended helical pitch length.

The nematic liquid crystal material may be a material containing, e.g., cyanobiphenyl, tolane or pyrimidine, and having a positive dielectric anisotropy. More specifically, MN1000XX (manufactured by Chisso Co., Ltd.) as well as ZLI-1565, BL-009 and MLC6436 (all manufactured by Merck Co., Ltd.) may be available. The nematic liquid crystal material MN1000XX has the following properties.

$\Delta n=0.219$ ($\lambda=589$ nm), $T_{N-I}=69.9°$ C., $V_{90}=2.29$ V, $\eta_{20}=30.6$ cps The chiral ingredient may be a compound having asymmetric carbon and inducing an optical rotation in liquid crystal molecules. More specifically, chiral dopant S-811, S-1011, CB15, CE2 (all manufactured by Merck Co., Ltd.) and others may be available. Cholesteric nonanoate CN (manufactured by Merck Co., Ltd.) of cholesteric liquid crystal material may be used as a chiral ingredient.

As the liquid crystal material exhibiting cholesteric characteristic, several kinds of liquid crystal materials having selective reflection wavelengths, which are in the visible range and are different from each other, may be used, and may be individually applied onto different positions (where pixels are to be formed) on the resin precursor applied surface without causing mixture. In this case, one pixel for the multi-color display is formed of these plurality of liquid crystal regions. The plurality of liquid crystal materials exhibiting cholesteric characteristic and having different selective reflection wavelengths may be formed of the chiral nematic liquid crystal material which includes the nematic liquid crystal and the chiral ingredient mixed therein, as described above, in which case the plurality of liquid crystal materials can be easily prepared by adjusting the mixing ratio of the chiral ingredient for changing the helical pitches of the produced liquid crystal materials exhibiting cholesteric characteristic.

Said resin precursor may be ultraviolet-curing monomer and/or oligomer in view of a mutual action with the liquid crystal material, reliability, adhesivity to the base and others, and preferably may be, for example, monomer and/or oligomer of acrylic, methacrylic or epoxy monofunctional or multi-functional resin. Such resin precursor may be adamantane methacrylate, BF-530 (manufactured by Daihachi Kagaku Co., Ltd.), R-128H, R-712, R-551 (all manufactured by Nippon Kayaku Co., Ltd.) or the like. The resin which can be cured with light such as ultraviolet light allows easy control of start and stop of polymerization and easy control of portions to be polymerized.

If the ultraviolet-curing resin is used, a polymerization initiator may be, for example, DAROCUR 1173 or IRGACUR 184 (both manufactured by Ciba Geigy Co., Ltd) which can induce radical polymerization of resin when radiated with ultraviolet light.

The resin precursor may be monomer and/or oligomer of thermosetting resin such as epoxy resin.

The resin precursor may be a material other than monomer and oligomer, provided that it can finally form cured resin. For example, polymer of thermoplastic resin may be used as the resin precursor. In this case, resin fluidized by heating may be used as the resin precursor, and may be solidified by cooling to produce finally the intended resin. A solution containing resin dissolved in a solvent may be also used as the resin precursor. In this case, by volatilizing the solvent, the intended resin can be finally produced.

For preventing mixing of the resin precursor and the liquid crystal material before solidification of the resin precursor, it is desired to use a combination of the resin precursor and the liquid crystal material, which does not cause compatibilizing at a temperature during making the liquid crystal device. For satisfying this, the ultraviolet-curing resin precursor R-128H may be used in combination with the chiral nematic liquid crystal material which contains the nematic liquid crystal material MN1000XX and the chiral ingredient S-811 added thereto. Also, ultraviolet-curing resin precursor R-712 or R-551 may be arbitrarily used in combination with the nematic liquid crystal material MLC6436 or ZLI-1565 together with the chiral ingredient CN or S-1011.

The bases holding the composite layer conceptually include flexible or less flexible plate-like members, flexible or soft films or the like. For example, one of the paired bases may be a plate having a hardness which allows holding of the composite layer including the liquid crystal material and the resin, and the other may be a member such as a film for protecting the composite layer. If the resin is cured by radiation with light (e.g., ultraviolet light), the base on the light incident side is preferably made of the material which neither scatters nor absorbs the light (e.g., ultraviolet light). For example, the material of the bases may be glass, polyethylene terephthalate, polycarbonate, polyether sulfone or the like. A transparent member is employed as at least one of the bases.

The first and second bases may be provided with electrodes for applying drive voltages. Several manners may be employed for forming the pixels (providing the pixel positions) by these electrodes. For example, one of the electrodes may have a film-like form covering the entire or substantially entire surface of the base, and the other electrode may have a matrix form. Also, both the electrodes may have the matrix form. One of the electrodes may be formed of a large number of parallel line-like members, and the other may be formed of a large number of parallel line-like members perpendicular thereto.

In this case, droplets of the liquid crystal material are applied to positions corresponding to the pixels defined by the electrode of the matrix form without mixing, respectively. Thereby, a resin partition is formed in the other, i.e., non-display regions, and the composite layer can have the liquid crystal materials, which are individually located in the positions corresponding to the pixels formed by the matrix-like electrode, respectively. If the composite layer comprises the liquid crystal materials which have different selective reflection wavelengths in the visible range and exhibit the cholesteric characteristic, each pixel for multi-color display is formed of the plurality of pixels to which the droplets of these liquid crystal materials are applied.

The electrode may be usually arranged on the surface of each base, which will be finally in contact with the composite layer. It is desired that the electrode is covered with an insulating film arranged thereon for electrically insulating the composite layer and the electrode from each other.

For providing the transparent electrode, the electrode may be formed of a material such as ITO (Indium Tin Oxide), $SnO_2$, $InO_3$ or the like, or may be made of a thin metal film or the like.

The liquid crystal device made by the method of the first example may be driven by various manner. For example, the drive voltage may be applied across the electrodes arranged on the respective bases. Also, the liquid crystal device may be inserted between a pair of electrodes which are externally arranged, and a voltage may be applied across the externally arranged electrodes. A voltage may be applied across a conductive film arranged on one of the bases and an external electrode (e.g., a pen electrode or an eraser electrode) arranged outside the other base.

For providing the composite layer having a predetermined thickness, a spacer may be employed. The spacer may be made of plastics, glass or the like, and may be, for example, particles of such a material. For example, the spacers are applied onto or dispersed on the base, or may be mixed into the resin precursor. The diameter of the spacer particle is substantially equal to or slightly smaller than the intended thickness of the composite layer. This is because the thickness of the composite layer is substantially determined by the height of the resin partition, but slightly exceeds the height of the resin partition.

For display at a high resolution, each liquid crystal region may be reduced in size for reducing the size of the pixel formed thereby. This can be achieved by reducing the diameter of the liquid crystal droplet to an appropriate value which is desirably equal to about 500 $\mu$m or less. An ink jet method or the like can be effectively used for precisely applying such small droplets to predetermined positions. According to the ink jet method, it is easy to control the positions to which the liquid crystal droplets are applied as well as the size of the droplets, whereby the pitch of the arranged pixels as well as the size of the pixel can be controlled easily. Also, fast application of the droplets can be performed.

In the above method, a black light absorbing layer of an appropriate size enough to cover the composite layer may be opposed to a side of the composite layer remote from the viewer side. This enables display of a black which is the background color when the liquid crystal material is transparent. For example, if the liquid crystal material is the liquid crystal material exhibiting cholesteric characteristic and has the selective reflection wavelength in the visible range, a display in black and a color corresponding to the above wavelength can be performed. The black light absorbing layer may be disposed at any position spaced from the viewer side with the composite layer therebetween, but is desirably disposed closer to the viewer side for obtaining a higher black level. For example, in the structure including the bases each provided with an electrode and an insulating film, the electrode, the insulating film and the black light absorbing layer are disposed in this order on one of the bases, which is opposed to the side of the composite layer remote from the viewer side. One of the insulating films may have the size enough to cover the composite layer, and may be black, whereby it may also be used as the black light absorbing layer. In these cases, the position of the black light absorbing layer can be shifted by a distance, which corresponds to the thicknesses of one base, one electrode and one insulating film, toward the viewer side compared with the structure in which the independent black light absorbing layer is disposed on the outer side of the base, i.e., the side remotest from the viewer side. Therefore, the black level and therefore the contrast are improved.

Black coloring agent may be mixed into the resin precursor so that the produced resin partition exhibits a black appearance. This can likewise improve the black level in the portion other than the liquid crystal region, and thus can improve the contrast. Methods other than the mixing of the black coloring agent into the resin precursor may be employed. For example, coloring agent may be applied onto the surface of the first base, onto which the resin precursor is already applied, before application of the droplets of the liquid crystal material, whereby only the side of the resin partition near the viewer can be colored in black so that an effect similar to the above can be achieved.

For cutting off scattered ingredients of the light which are produced due to discrimination between the liquid crystal domains, an extremely small amount of dye may be added into the liquid crystal material, or a color filter may be arranged on the outer or inner side of the base on the light-reflection side (viewer side). Such dye may be selected that can absorb spectral light of wavelengths other than the selective reflection wavelength of the liquid crystal material, whereby the contrast can be improved. In this case, the dye may be mixed or dissolved into either the liquid crystal material or the resin partition. However, in the structure employing black coloring agent mixed into the resin partition, it is necessary to mix or dissolve the dye into the liquid crystal material, and the black coloring agent should not be mixed or dissolved into the liquid crystal material. The dye added into the liquid crystal material or the resin partition may be dichroic coloring agent for a liquid crystal display such as SI-426 or M-483 (both manufactured by Mitsui Toatsu Senryo Co., Ltd.).

For driving the liquid crystal device, which uses the liquid crystal material exhibiting cholesteric characteristic by application of the voltage, two kinds of, i.e, high and low pulse voltages are selectively applied to the composite layer for switching the orientation of the liquid crystal molecules between the planar orientation and the focal conic orientation.

After cease of application of a high pulse voltage by which the liquid crystal material can attain the homeotropic orientation, the liquid crystal material in the composite layer will attain planer orientation, in which the helical axis of each domain comprising a plurality of liquid crystal molecules is perpendicular to the base. After cease of application of a low pulse voltage by which the liquid crystal material cannot attain the homeotropic orientation completely, the liquid crystal material will attain focal conic orientation, in which helical axes of the domains are directed randomly or substantially parallel to the base. The planar orientation and the focal conic orientation are stably held.

When the liquid crystal material exhibiting cholesteric characteristic is in the planar orientation, it selectively reflects the light of the wavelength corresponding to a product of the helical pitch length and the average refractivity thereof. Therefore, the liquid crystal materials, which have the selective reflection wavelengths in the red, blue and green ranges, respectively, may be used so that these liquid crystal materials in the planar orientation selectively reflect the light of the respective wavelengths to exhibit red, blue and green appearances. In the focal conic orientation, they scatter the incident light to exhibit an opaque appearance. If the helical pitch length is short as can be seen in the case where the liquid crystal material exhibiting cholesteric characteristic has the selective reflection wavelength in the visible range, scattering of the visible light is suppressed, and the helical axes are directed substantially parallel to the base so that a state close to a transparent state can be achieved.

Accordingly, the liquid crystal material exhibiting cholesteric characteristic and having the selective reflection wavelength in the visible range may be used, and the background color may be black, whereby display by selective reflection (planar orientation) and display in black (focal conic orientation) can be performed by switching the state between the planar orientation and the focal conic orientation.

Description will now be given on the first example of the method of making the liquid crystal device of the invention with reference to FIG. 1 (schematic view).

As shown in FIG. 1(A), a transparent first base or plate 5A is prepared. The base 5A is provided on its one surface with a large number of parallel transparent conductive films (transparent electrode) 6A each having a line-like form and an insulating film 7A arranged on the films 6A. The base 5A is also provided on its other surface with a black light absorbing layer 8. Precursor 9b' of ultraviolet-curing resin is applied onto the insulating film 7A.

Figure 1B:
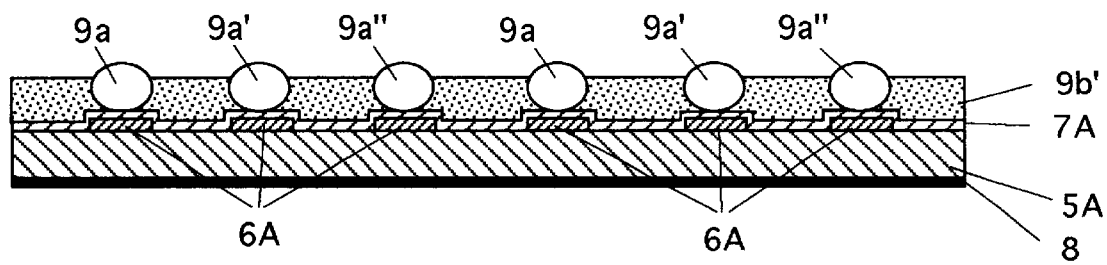

As shown in FIG. 1(B), droplets of liquid crystal materials 9a, 9a' and 9a" exhibiting cholesteric characteristic are applied or dropped to pixel positions determined by the conductive films 6A on the precursor applied surface and conductive films 6B, which will be described later. Each liquid crystal droplet has a diameter of 500 μm or less, and these droplets are dispersed during application for preventing mixing of the applied droplets. The liquid crystal materials 9a, 9a' and 9a" have selective reflection wavelengths in the red, green and blue ranges, respectively. The droplets are applied to a position where one pixel for color display can be formed by these three kinds of liquid crystal regions. A combination of the resin precursor 9b' and the liquid crystal materials 9a, 9a' and 9a" is selected such that they are not compatibilized at a producing temperature.

Figure 1C:
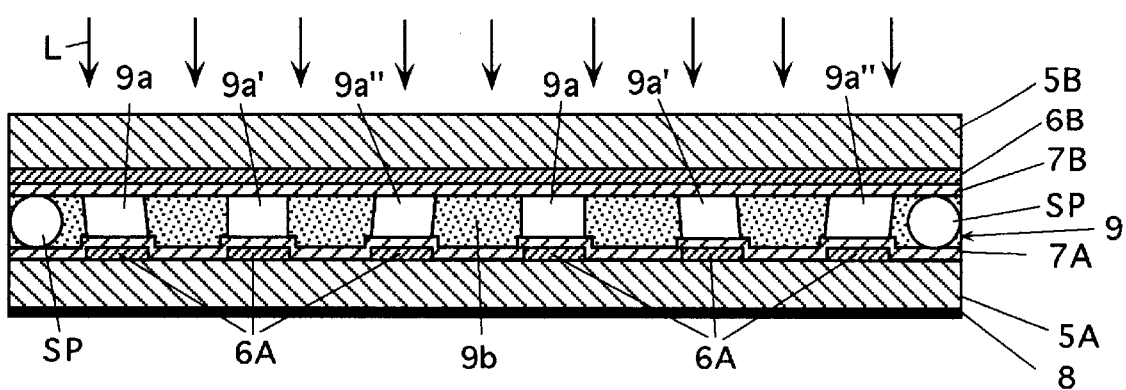

Then, a second base 5B is arranged as shown in FIG. 1(C). The base 5B is provided with the large number of line-like transparent conductive films (transparent electrode) 6B which extend parallel to each other and perpendicularly to the conductive films 6A, and is also provided with an insulating film 7B over the films 6B. Spacers SP are dispersed on and adhered to the insulating film 7B. The base 5B is placed on the resin precursor and the liquid crystal materials with the conductive films 6B directed inward, and the resin precursor and the liquid crystal materials are retained between the first and second bases 5A and 5B. In the illustrated example, the outer side or surface of the second base 5B is entirely radiated with ultraviolet light L for solidifying or curing the resin precursor 9b'. Thereby, the liquid crystal device is completed. In the composite layer 9 of the liquid crystal device thus produced, the liquid crystal materials 9a, 9a' and 9a" are arranged at each of the positions corresponding to the pixels which are defined by the conductive films 6A and 6B arranged in a matrix form, and the resin partition 9b is formed in the other, i.e., non-display regions. If the black light absorbing layer 8 is not provided, the opposite sides of the assembly of the first and second bases 5A and 5B may be exposed to the ultraviolet light L for solidifying or curing the resin precursor 9b'. Thereafter, the black light absorbing layer 8 may be arranged.

For driving the liquid crystal device, a predetermined voltage is applied across the selected conductive films 6A and 6B from an unillustrated power source so that the predetermined voltage, which achieves the planar or focal conic orientation, is applied to each pixel, and thereby image information of characters, graphics or the like can be written into the composite layer 9. In this operation, one pixel for multi-color display is formed of three pixels, which neighbor to each other and are formed of the liquid crystal materials having the selective reflection wavelengths in the red, green and blue ranges, respectively. In this one pixel, each of the three regions is appropriately set to the planar or focal conic orientation, whereby the multi-color display in eight colors can be performed, more specifically eight colors including black which is performed when all the regions are in the focal conic orientation and thus the background color is displayed, and the combination color of red, green and blue which is performed when these regions are selectively or entirely in the planar orientation.

As described above, the liquid crystal droplets are in dispersed for preventing mixing when they are applied. Also, the combination of the resin precursor and the liquid crystal materials is selected not to be compatibilized at a producing temperature of the liquid crystal device. Therefore, the liquid crystal materials of the respective colors are not mixed with each other during and after the manufacturing process, and such a state is maintained that the liquid crystal materials are present within the regions separated by the resin partition, respectively. Further, the resin partition and the liquid crystal regions are precisely formed in the predetermined positions.

Figure 2A:
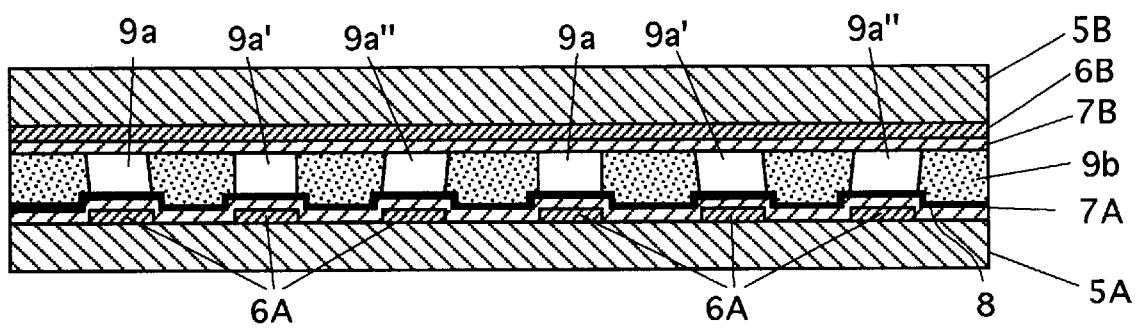
FIGS. 2(A), 2(B), and 2(C) are cross-sectional views illustrating positions where a black, light absorbing layer can be disposed.

The black light absorbing layer 8 may be arranged on the side of one of the bases, which will form the outer side in the product, whereby the produced liquid crystal device can have the black light absorbing layer 8 in the position remotest from the viewer, as shown in FIG. 1(C). By providing the black light absorbing layer 8 on the insulating film of one of the base(on the insulating film 7A of the first base 5A in this example), it is possible to provide the liquid crystal device in which the black light absorbing layer 8 is disposed in the position shown in FIG. 2(A). In this structure, the black light absorbing layer 8 is shifted by the distance corresponding to the thicknesses of the one insulating film 7A, one transparent conductive film 6A and first base 5A toward the viewer side so that the black level is increased and the contrast is improved.

Figure 2B:
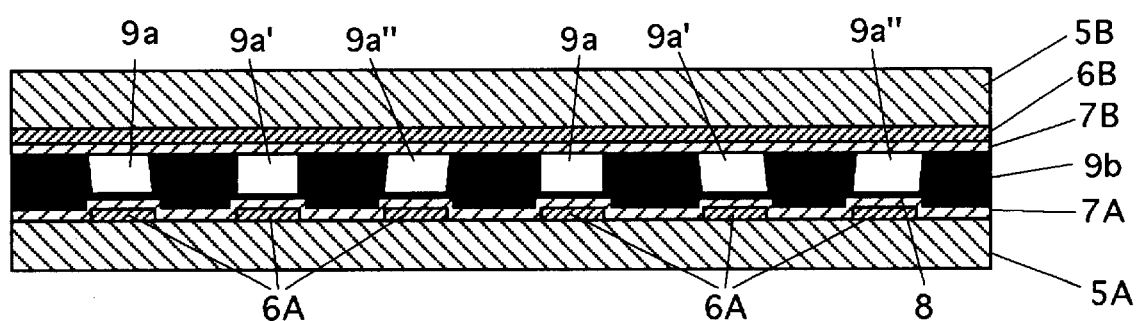
Figure 2C:
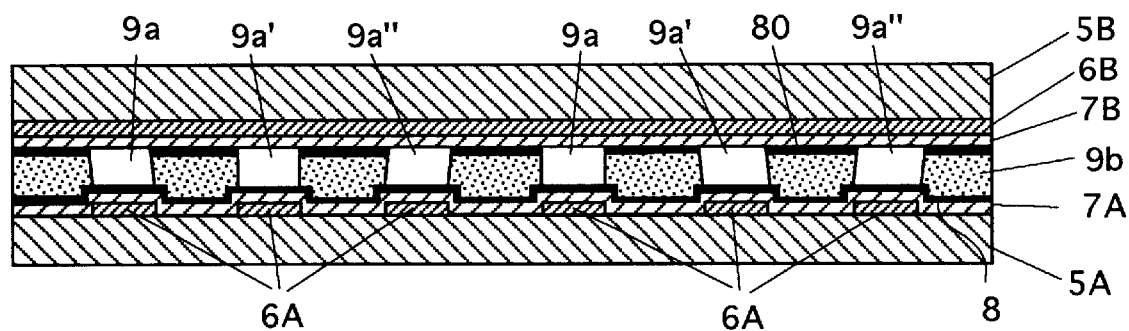

By mixing the black coloring agent into the resin precursor, the liquid crystal device, which is provided with the black light absorbing layer 8 thus arranged, can have the structure shown in FIG. 2(B), and the resin partition 9*b* exhibits a black appearance so that the contrast is further improved. Alternatively, coloring agent 80 may be laid on the resin precursor after application of the resin precursor and before application of the liquid crystal droplets. By this manner or the like, it is possible to provide the resin partition 9*b* which is black only in its upper portion near the viewer as shown in FIG. 2(C), in which case the contrast is likewise improved.

Figure 3:
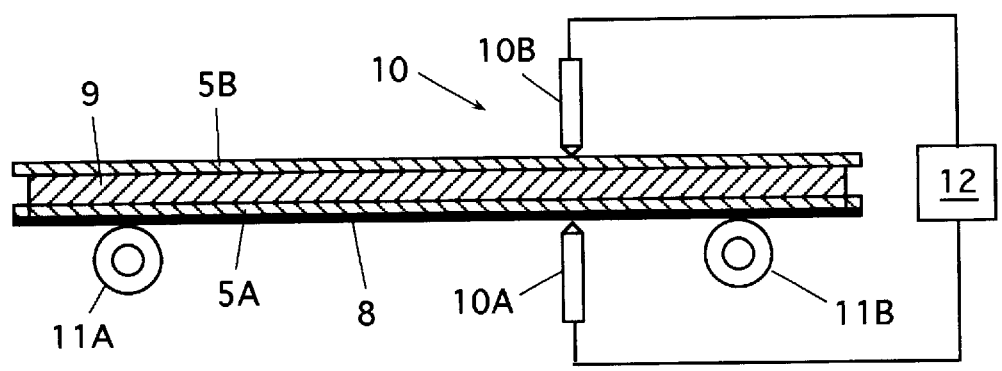
FIG. 3(A) is a cross-sectional view showing an operational state of a liquid crystal device produced by a method of another embodiment of the present invention.
FIG. 3(B) is a perspective view of the view of FIG. 3(A)
Figure 3:
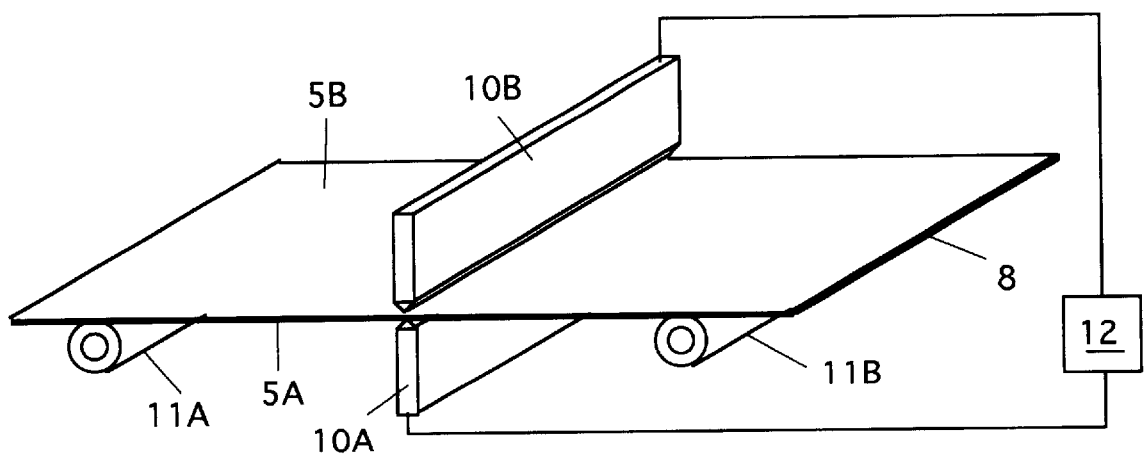

FIG. 3(A) is a side view showing a manner of use of another example of the liquid crystal device provided by the foregoing first example of the method, and FIG. 3(B) is a perspective view showing the same. For making this liquid crystal device, the method uses the bases 5A and 5B which are the same as those shown in FIG. 1 but are not provided with the conductive films 6A and 6B as well as the insulating films 7A and 7B. The liquid crystal droplet is applied to each position where an external electrode array 10, which will be described later, applies a drive voltage. Manners other than the above are the same as those employed in the method shown in FIG. 1. The internal structure of the composite layer 9 is not shown in the figure.

For driving this liquid crystal device, the external electrode array 10 is used. The electrode array 10 has a length equal to or longer than the widths of bases 5A and 5B, and is formed of a pair of electrode supports 10A and 10B carrying a plurality of electrodes which are arranged in the width direction of the bases. The electrode supports 10A and 10B are spaced by a small distance from each other, and the electrodes supported thereon are opposed to each other. The bases 5A and 5B holding the composite layer 9 therebetween can move through a space between the electrode supports 10A and 10B in accordance with rotation of rollers 11A and 11B. The electrode supports 10A and 10B are connected to a write unit 12 which applies pulse voltages, which correspond to an original image or the like, across the electrodes.

For driving this liquid crystal device, the unit 12 applies two kinds of, i.e., high and low pulse voltages (e.g., of 160 V and 10 msec, and 80 V and 10 msec) corresponding to the image information to the composite layer 9 through the electrodes on the electrode supports 10A and 10B so that the respective portions of the composite layer can be set to the planar orientation or the focal conic orientation similarly to the liquid crystal device produced by the method shown in FIG. 1. More specifically, the paired bases 5A and 5B holding the composite layer 9 therebetween are moved through the electrode supports 10A and 10B of the external electrode array 10. Thereby, a uniform voltage may be applied to the whole area of the composite layer 9 held between the bases 5A and 5B so that the composite layer 9 can be entirely and uniformly changed into a single state. Alternatively, image information of is characters, graphics or the like can be written into the composite layer 9 by applying predetermined voltage signals corresponding to the image information to the composite layer. In the above example, the paired bases 5A and 5B holding the composite layer 9 are moved by rotating the rollers 11A and 11B. Alternatively, the bases 5A and 5B may be fixed, and the external electrode array 10 may be moved.

The liquid crystal device described above can be used as a rewritable paper. By eliminating the black light absorbing layer 8, the device may be used as a rewritable OHP (overhead projector) sheet. This device can be used such that a pen carrying a voltage is brought into contact with the base for rewriting.

Figure 4:
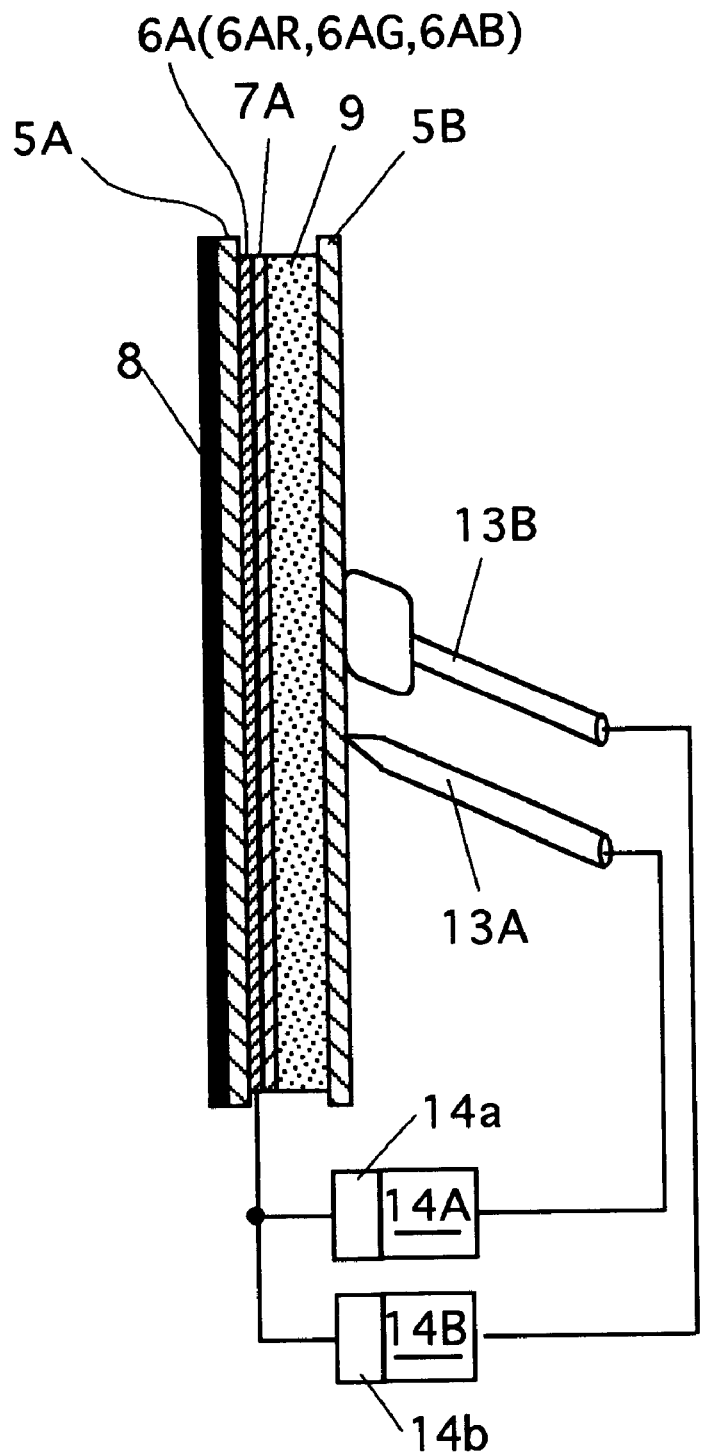
FIG. 4 is a partial cross-sectional view showing an operational state of a liquid crystal device produced by a method of yet another embodiment of the present invention.

FIG. 4 is a side view showing a manner of use of still another example of the liquid crystal device produced by the method of the foregoing first example. This liquid crystal device is used as an electronic blackboard, and is made in a method similar to that shown in FIG. 1. However, the base 5B opposed to an user is not provided with the conductive film 6B and the insulating film 7B shown in FIG. 1. The liquid crystal droplets are applied to respective portions, which are subjected to the drive voltage applied across these portions of the conductive films 6A on the base 5A and a pen electrode 13A to be described later. The device is provided with a great number of pixels for the multi-color display, each of which is formed of three kinds of liquid crystal materials having the selective reflection wavelengths in the red, green and blue ranges, respectively. Other manners are the same as those shown in FIG. 1. The internal structure of the composite layer 9 is not shown in the figure. The conductive films (electrode) 6A on the base 5A will now be described below more in detail. The conductive films 6A are formed of three kinds of conductive films, i.e., a conductive film 6AR for applying a voltage to the liquid crystal material for display in red, a conductive film 6AG for applying a voltage to the liquid crystal material for display in green and a conductive film 6AB for applying a voltage to the liquid crystal material for display in blue. These conductive films 6AR, 6AG and 6AB are connected to a write pulse power source 14A through a selector switch 14*a*, and is also connected to an erasing pulse power source 14B through a selector switch 14*b*. The pen 13A is connected to the write power source 14A, and an eraser electrode 13B is connected to the erasing power source 14B. The pen electrode 13A is an electrode for writing image information such as characters and graphics, and has a thin tip for easy writing and drawing of characters and others. The pulse power source 14A generates a pulse voltage of, e.g., 100 V and 10 msec. The eraser electrode 13B is used as an eraser for erasing the image information written in the composite layer 9 by the pen electrode 13A, and has a thick tip for erasing a large area. The pulse power source 14B generates a pulse voltage of, e.g., 50 V and 10 msec. The eraser electrode 13B may have the tip formed of an electrode array.

For using this liquid crystal device (electronic blackboard), all the liquid crystal materials are usually set to the focal conic orientation for exhibiting a black appearance before writing. When characters, graphics or the like are to be written, one or more of the groups of the conductive films 6AR, 6AG and 6AB on the base 5A is connected to the power source 14A through the switch 14*a* in accordance with an intended color. For example, when display in red is required, the group of conductive films 6AR is connected to the power source 14A through the switch 14*a*. For display in white, the groups of conductive films 6AR, 6AG and 6AB are connected to the power source 14A. The pen electrode 13A is moved on the base 5B in the above state. Thereby, the liquid crystal materials applied with the pulse voltage attain the planar orientation to display the characters and graphics in the intended color. For erasing the written characters, graphics and others, the eraser electrode 13B is moved on the portions of the base 5B carrying the information to be erased. If the information on an intended portion traced by the eraser electrode 13B is to be fully erased, all the conductive films 6AR, 6AG and 6AB on the base 5A are connected to the power source 14B through the selector switch 14*b*. If only a specific color(s) is(are) to be erased, one or two of the conductive films 6AR, 6AG and 6AB corresponding to the intended color(s) is(are) connected to the power source 14B through the switch 14b. For safety of users, the pen electrode 13A and the eraser electrode 13B may be provided with switches for allowing application of the voltages to the electrodes 13A and 13B only when these switches are on, respectively.

Another specific example (second example) of the method of making the liquid crystal device according to the invention will now be described below.

SECOND EXAMPLE

This example uses a pair of bases, at least one of which is flexible and has a film-like form. Precursor of photo-setting resin is applied onto the first base to form a layer of a predetermined uniform thickness. Dispersed droplets of liquid crystal material are applied onto the resin precursor applied surface. The second base in the film-like form is arranged on the resin precursor and the liquid crystal material for holding the resin precursor and the liquid crystal material between the first and second bases. An assembly of the paired bases holding the resin precursor and the liquid crystal material therebetween are moved relatively through a space between a pair of rollers spaced from each other by a predetermined distance for making the thickness of the assembly uniform. The resin precursor is cured to form a resin partition by radiation with light. Thereby, the method provides the liquid crystal device, in which a composite layer including the resin partition and the liquid crystal material is held between the first and second bases.

In this method, various materials and manners are the same as those in the first example. For example, material of the liquid crystal and material of the photo-curing resin precursor, the polymerization initiator, the electrode, the insulating film, the spacer, and the black light absorbing layer as well as the manner of removing scattered light components due to discrimination between the liquid crystal domains, the manner of applying liquid crystal droplets, and others are the same as those in the first example.

In this second example, it is necessary that the second base is flexible and has a film-like form, but the first base may be a flexible or less flexible plate-like member, a flexible film-like member or the like. The materials of these bases may be selected from those which can be used in the method of the first example.

For spreading the resin precursor onto the first base, a blade or the like may be used to form the layer of a uniform thickness.

In this example, spreading of the resin precursor to the first base, application of the liquid crystal droplets, arrangement of the second base, pressing by the roller pair and radiation with light may be performed in such a manner that each step starts after the preceding step was completely effected on the whole base(s). Alternatively, the steps may be performed as follows. Since the second base is flexible and has the film-like form, uniform application of the resin precursor may be initially effected on an end of the first base and then may be successively effected on the other portions, and application of the liquid crystal droplets may be successively effected on the portions already coated with the resin precursor. In this case, the film-like second base is successively laid over the portions already carrying the droplets, and the portions already covered with the second base are successively moved through the roller pair. Further, the radiation with light is successively effected on the portions passed through the roller pair. In this manner, the respective steps can be performed continuously. In this case, the portion actually processed in each of the foregoing steps may be successively changed from one end of the first base toward the other end while keeping the first base still. Alternatively, the first base may be moved through devices or units performing the foregoing steps, respectively, so that the portion actually processed in each of the foregoing steps may successively change from one end of the first base toward the other end.

In this example, the precursor of the photo-curing resin is used as the resin precursor. This is because a limited narrow portion is cured by radiation with light, and therefore the respective steps can be continuously performed without difficulty.

The second example of the method of making the liquid crystal device of the invention will be described below with reference to FIG. 5 (schematic view).

First, the first base 5A is prepared. The first base 5A is provided at one of its surfaces with a large number of parallel transparent conductive films (transparent electrode) each having a line-like form and the insulating film arranged on the conductive films, and is also provided at its other surface with the black light absorbing layer 8. The transparent conductive films and the insulating film are not shown in the figure. Starting at an end of the insulating file on the base 5A, the precursor 9b' of ultraviolet-curing resin is successively applied onto the insulator from a nozzle N1 of a resin precursor reservoir S1, and is uniformly spread by a blade B.

Droplets of the liquid crystal materials 9a, 9a' and 9a" exhibiting cholesteric characteristic are successively applied to the portions, to which the resin precursor 9b' is already applied, from nozzles N2, N3 and N4 of liquid crystal reservoirs S2, S3 and S4, respectively, and more specifically are applied to the positions corresponding to the respective pixels defined by the conductive films 6A and the conductive films 6B, which will be described later. The droplet to be applied has a diameter of 500 μm or less, and mixing with another droplet is prevented after application. The liquid crystal materials 9a, 9a' and 9a" have selective reflection wavelengths in the red, green and blue ranges, respectively, and these three kinds of liquid crystal regions form one pixel for multi-color display. A combination of the resin precursor 9b' and liquid crystal materials 9a, 9a' and 9a" is selected not to be compatible at a temperature during making the liquid crystal device.

Then, the film-like second base 5B is laid over the resin precursor and the liquid crystal material. The base 5B is supplied from a film supply device FS. The base SB includes the large number of parallel transparent conductive films each having a line-like form and extending perpendicularly to the foregoing conductive films (not shown), and also includes the insulating film disposed on the conductive films. Dispersed spacers (not shown) are adhered to the insulating film. These transparent conductive films and the insulating film are not shown in the figure. The film-like base 5B, of which conductive films are directed inwardly, is successively laid over the portions onto which the droplets of liquid crystal materials 9a, 9a, and 9a" are already applied, and the resin precursor and the liquid crystal materials are held between the first and second bases 5A and 5B, Then, the portions on which the second base 5B is already applied are successively moved between the pair of rollers R spaced by a predetermined distance for making the total thickness of the pair of bases 5A and 5B uniform, holding the resin precursor 9b' and the liquid crystal materials 9a, 9a' and 9a" therebetween.

The portions which are already passed through the roller pair R are successively radiated with ultraviolet light L emitted from an ultraviolet lamp UV opposed to the second base 5B, and thereby the resin precursor 9b' is cured. For the foregoing steps, the resin precursor nozzle N1, the blade B. the liquid crystal nozzles N2, N3 and N4, the second base supply device FS, the roller pair R and the ultraviolet lamp UV are disposed in this order along a path of the first base 5A. However, in a case where the upper one of the roller pair R is transparent and accommodates the ultraviolet lamp UV therein, making the thickness uniform and curing the resin precursor can be achieved in single step.

Through the above steps, the method produces the liquid crystal device having the composite layer, in which the liquid crystal materials 9a, 9a' and 9a" of the respective colors are arranged in each of the positions of the pixels defined by the conductive films on the bases 5A and 5B, and the resin partition 9b is formed in the other, i.e., non-display regions.

The method of making the liquid crystal device of this second example can achieve the advantages similar to those of the method of the first example already described with reference to FIG. 1.

Further, the following advantage can be achieved. Since the second base 5B is made of the flexible film-like member, various steps, i.e., application of the resin precursor 9b', application of the liquid crystal materials 9a, 9a' and 9a", placement of the second base 5B, pressing by the roller pair R and radiation with the ultraviolet light L can be started at co one end and can be successively effected toward the other end while moving the first base 5A. Thereby, the size of the producible liquid crystal device can be increased without increasing the whole size of the producing apparatus.

In this example, the liquid crystal device is driven in the same manner as the liquid crystal device produced by the method of the first example. Also, the position where the black light absorbing layer 8 is disposed may be the same as that of the first example shown in FIG. 2.

In the method of making the liquid crystal device of the invention, the foregoing step (b) may include the steps of: (b1) dispersing a material of the first phase on said surface of the first base in a predetermined second pattern, and (b2) dispersing the liquid crystal material of the second phases on said surface in the predetermined first pattern.

This will be described below more in detail as the following third example.

THIRD EXAMPLE

This example uses the pair of bases. Droplets of the resin precursor are applied to the predetermined portion on the first base where the resin partition is to be formed, and droplets of the liquid crystal material are applied to the predetermined portions on the first base where the pixels are to be formed, respectively. The second base is disposed on the resin precursor and the liquid crystal material for holding the resin precursor and the liquid crystal material between the first and second bases. The resin precursor is cured to form the resin partition to complete the liquid crystal device in which the composite layer including the resin partition and the liquid crystal material is held between the first and second bases.

In this third example, various materials and manners are the same as those in the first example. For example, material of the liquid crystal and material of the resin precursor, the polymerization initiator, the base, the electrode, the insulating film, the spacer, and the black light absorbing layer as well as the manner of removing scattered light components due to discrimination between the liquid crystal domains, and others are the same as those in the first example.

In this third example of the method, it is desirable that not only the liquid crystal droplet but also the resin precursor droplet has a diameter of about 500 μm or less for display in high resolution. An ink jet method or the like can be effectively used as a method for applying such small droplets.

Description will now be given on the third example of the method of making the liquid crystal device of the invention with reference to FIGS. 6(A) and 6(B) (schematic view).

Figure 6A:
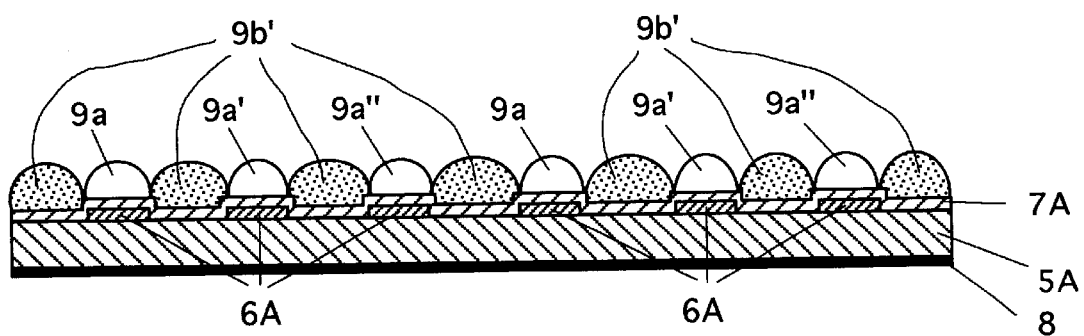
FIGS. 6(A) and 6(B) are cross-sectional views illustrating a method of making a liquid crystal device by yet a further embodiment of the method of the present invention.

First, as shown in FIG. 6(A), the transparent first base 5A is prepared. The first base 5A is provided at one of its surfaces with many parallel transparent conductive films (transparent electrode) 6A each having a line-like form and the insulating film 7A disposed thereon, and is also provided at its other surface with the black light absorbing layer 8. Droplets of the liquid crystal materials 9a, 9a' and 9a", which exhibit cholesteric characteristic, and the ultraviolet-curing resin precursor 9b' are applied onto the insulating film 7A. In this operation, droplets of the liquid crystal materials 9a, 9a' and 9a" are applied to each of the positions corresponding to the respective pixels which are defined by the conductive films 6A and the conductive films 6B to be described later, and droplets of resin precursor 9b' are applied to the other positions where the resin partition is to be formed. Each of the droplets of the liquid crystal material and resin precursor has a diameter of 500 μm or less, and is prevented from mixing with the other droplets after application. The liquid crystal materials 9a, 9a' and 9a" have selective reflection wavelengths in the red, green and blue ranges, respectively, and these three kinds of liquid crystal regions form one pixel for multi-color display. A combination of the resin precursor 9b' and the liquid crystal materials 9a, 9a' and 9a" is selected such that they are not compatible at a temperature during making the liquid crystal device.

Figure 6B:
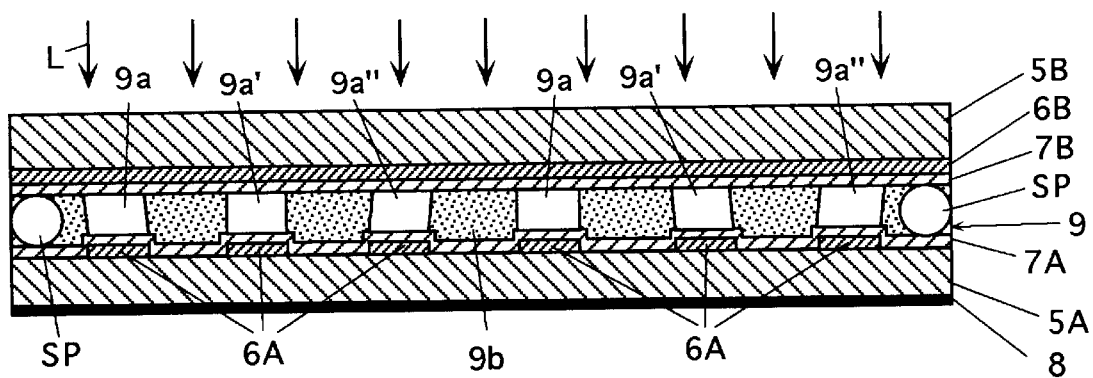
Figure 7A:
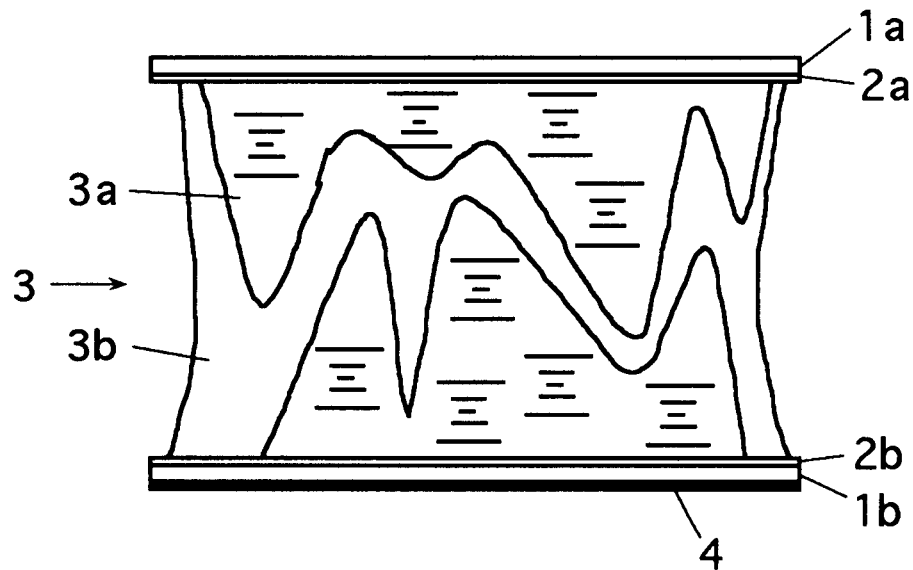
FIGS. 7(A) and 7(B) are cross-sectional views of a conventional liquid crystal device in a planar orientation and a focal conic orientation, respectively.
Figure 7B:
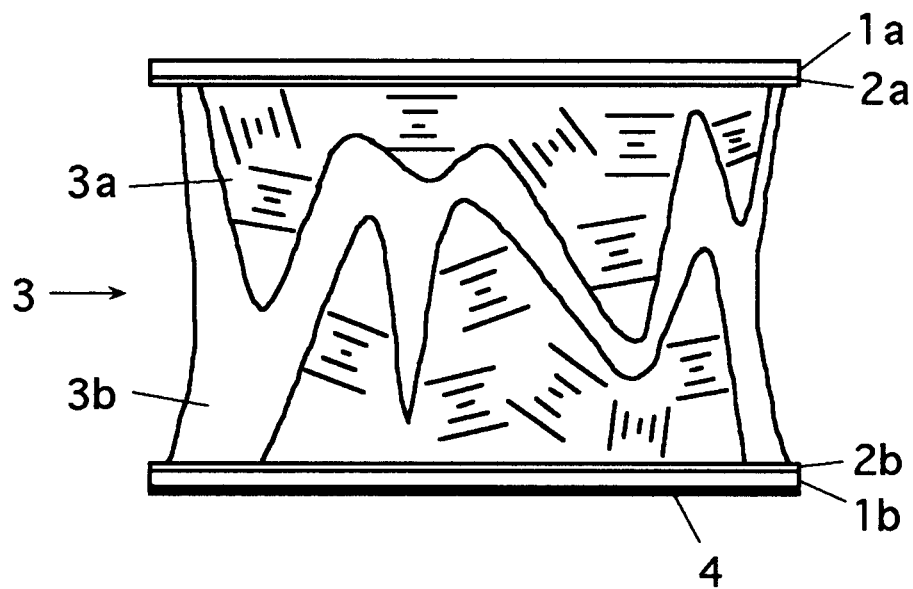
Figure 8:
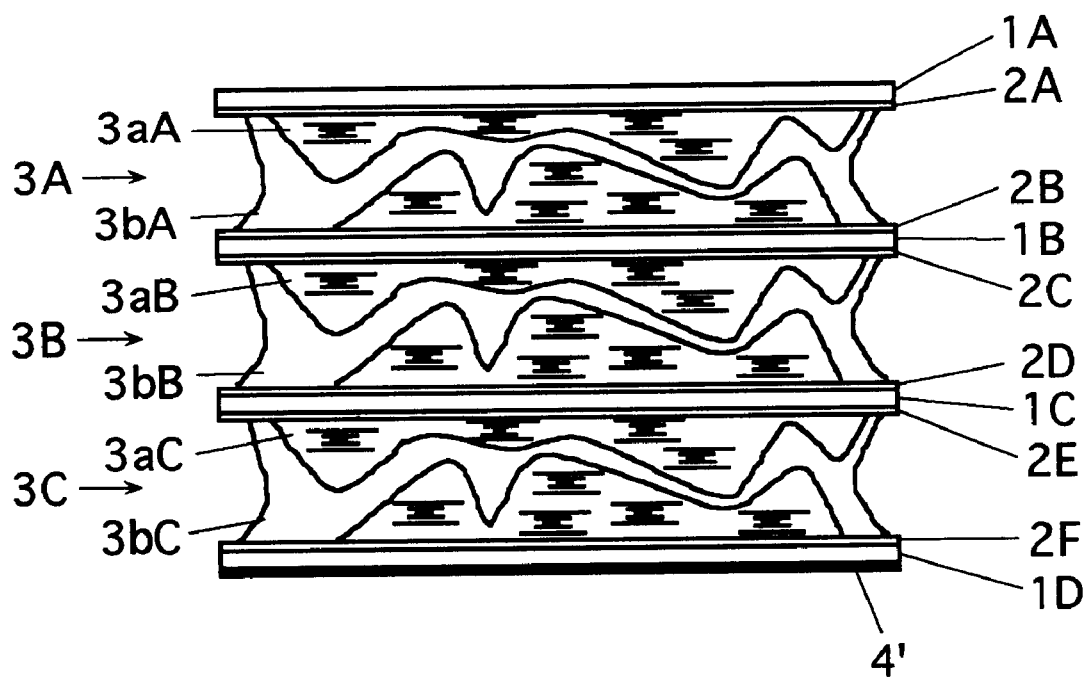
FIG. 8 is a cross-sectional view of a multilayer liquid crystal device of the present invention for a multi-color display.

Then, the second base 5B is formed as shown in FIG. 6(B). The base 5B is provided with the large number of line-like transparent conductive films (transparent electrode) 6B which extend parallel to each other and perpendicularly to the conductive films 6A, and is also provided with the insulating film 7B disposed on the films 6B. Spacers SP are dispersed on and adhered to the insulating film 7B. The base 5B is placed on the resin precursor and the liquid crystal material with the conductive films 6B directed inward, and the resin precursor and the liquid crystal material are retained between the first and second bases 5A and SB. In the illustrated example, the outer side or surface of the second base 5B is entirely radiated with ultraviolet light L for curing the resin precursor 9b'. Thereby, the liquid crystal device having the composite layer 9 is completed. In the composite layer 9 of the liquid crystal device thus produced, the liquid crystal materials 9a, 9a' and 9a" are arranged in each of the positions corresponding to the pixels which are defined by the conductive films 6A and 6B, and the resin partition 9b is formed in the other, i.e., non-display regions.

The method of making the liquid crystal device of this example can achieve the advantages similar to those of the method of the first example already described with reference to FIG. 1. In this example, the liquid crystal device is driven in the same manner as the liquid crystal device produced by the method of the first example. Also, the position where the black light absorbing layer 8 is disposed may be the same as that of the first example shown in FIG. 2.

The description has been given on the first, second and third examples of the method of making the liquid crystal device, in which the liquid crystal material exhibiting cholesteric characteristic is used, and the produced liquid crystal device utilizes their memory effects for display. However, the invention is not restricted to these example. A liquid crystal material exhibiting, for example, nematic characteristic or smectic characteristic may be used. Instead of the simple matrix driving, the produced liquid crystal device may be driven, for example, in the active matrix driving manner utilizing TFT elements or the like.

The method of making the liquid crystal device of the invention described above can be considered, from the viewpoint relating to the two neighboring liquid crystal cells, as the method in which a pillar is formed between the two liquid crystal cells.

This method is performed for forming a pillar between two liquid crystal cells, and includes the steps of:

(a) preparing a first base having a surface;

(b) providing, on said surface, two droplets of a liquid crystal material and providing a material on at least a portion between said droplets of the liquid crystal material; and (c) solidifying said material to form the pillar.

This method may further include the step (d) of providing a second base on the surface carrying said droplets of the liquid crystal material and said material. The step (d) may be executed after the step (b) and before the step (c).

This method according to the invention will now be described below more in detail. The following first, second and third examples can be exemplified, similarly to the foregoing method of making the liquid crystal device according to the invention.

FIRST EXAMPLE

In this method, a pair of bases are used, and resin precursor is applied onto the first base. One of liquid crystal droplets is applied to a first position on the resin precursor applied surface, and the other droplet of the liquid crystal material is applied to a second position on the resin precursor applied surface spaced from the first position. The second base is arranged on the resin precursor and the liquid crystal material for holding the resin precursor and the liquid crystal material between the first and second bases. The resin precursor is cured to form a resin pillar between the two liquid crystal cells.

SECOND EXAMPLE

This example uses a pair of bases, at least one of which is flexible and has a film-like form. Precursor of photosetting resin is applied onto the first base to form a layer of a uniform thickness. One of liquid crystal droplets is applied to a first position on the resin precursor applied surface, and the other droplet of the liquid crystal material is applied to a second position on the resin precursor applied surface spaced from the first position. The film-like second base is arranged on the resin precursor and the liquid crystal material for holding the resin precursor and the liquid crystal material between the first and second bases. An assembly of the paired bases holding the resin precursor and the liquid crystal material therebetween is moved relatively through a space between a pair of rollers spaced from each other by a predetermined distance for making the thickness thereof uniform. The resin precursor is cured to form a resin pillar between two liquid crystal cells by radiation with light.

THIRD EXAMPLE

This example uses a pair of bases. One of liquid crystal droplets is applied to a first position on the first base, and the other droplet of the liquid crystal material is applied to a second position on the first base spaced from the first position. A droplet of the resin precursor is applied to a third position between the first and second positions. The second base is disposed on the resin precursor and the liquid crystal material for holding the resin precursor and the liquid crystal material between the first and second bases. The resin precursor is cured to form a resin pillar between two liquid crystal cells.

The method of the invention for forming a pillar between two liquid crystal cells can achieve advantages similar to those of the method of making the liquid crystal device described before.

In this method, various materials and manners are the same as those in the first embodiment of the invention. For example, material of the liquid crystal and material of the resin precursor, the polymerization initiator, the base, the electrode, the insulating film, the spacer, and the black light absorbing layer as well as the manner of removing scattered light components due to discrimination between the liquid crystal domains, the manner of applying the droplets, and others are the same as those in the examples of the method of producing the liquid crystal device of the invention.

The invention will be described below with reference to practical examples, but the invention is not restricted thereto.

PRACTICAL EXAMPLE 1

The first base (plate) which is made of glass and has sizes of 100 mm by 100 mm is prepared. The first base is provided at one of its surfaces with the large number of line-like parallel conductive films (electrode) made of ITO and the insulating film made of polyimide and arranged on the conductive films. The first base is provided at the other surface with the black light absorbing layer. Ultraviolet-curing resin monomer R-128H (manufactured by Nippon Kayaku Co., Ltd.) is applied to the insulating film on the first base.

Then, droplets of the liquid crystal material, which exhibits cholesteric characteristic and is made of a mixture of nematic liquid crystal material MN1000XX (manufactured by Chisso Co., Ltd., $\Delta n=0.219$ ($\lambda=589$ nm), $T_{N-I}=69.9°$ C.) and chiral ingredient S-811 (manufactured by Merck Co., Ltd.) added thereto at a rate of 31.0% by weight with respect to the whole weight, are successively applied onto the surface coated with the resin monomer from an injection needle. These droplets are applied to positions corresponding to the pixels, respectively, which are defined by the conductive films (electrode) on the first base and the conductive films (electrode), which will be described later and are arranged on the second base. This liquid crystal material has the selective reflection wavelength of 570 nm, and can exhibit a green appearance. Each droplet of the liquid crystal material, which is individually applied, is 0.65 micro-liter in volume, and therefore has a diameter of about 500 μm.

Then, the second base (plate) made of glass is placed on the resin monomer and the liquid crystal material. The second base is provided with the large number of line-like conductive films made of ITO and extending perpendicularly to the line-like conductive films arranged on the first base, and is also provided with the insulating film made of polyimide and arranged on the conductive films. Spacer particles each having a diameter of 10 μm are dispersed on the insulating film. The second base is laid on the resin monomer and the liquid crystal material with the conductive films directed inward, and thereby the resin monomer and the liquid crystal material are held between the first and second bases. Ultraviolet light is emitted to the whole surface of the second base at a rate of 15 mw/cm² for one minute so that the resin monomer is cured. The liquid crystal device produced in the above method has the composite layer, in which the liquid crystal materials are arranged in positions corresponding to the respective pixels defined by the conductive films on the first and second bases, and the resin partition is formed in the other, i.e., non-display regions.

This liquid crystal device becomes transparent and exhibits the black background color when the focal conic orientation is attained due to application of the pulse voltage of 50 V and 10 msec. When a pulse voltage of 100 V and 10 msec is applied, it exhibits a green appearance as a result of selective reflection by the planar orientation. These states are held even after stopping voltage application, and bistability is exhibited.

In this liquid crystal device, it was found that neighboring liquid crystal regions are not gradually mixed together because the liquid crystal regions are completely separated from each other by the resin partition. Since the liquid crystal material and the resin monomer used in this device are not compatible at a room temperature, the liquid crystal regions and the resin partition can be precisely formed in the predetermined positions.

PRACTICAL EXAMPLE 2

The first base (plate) which is made of glass and has sizes of 100 mm by 100 mm is prepared. The first base is provided at one of its surfaces with the large number of line-like parallel conductive films made of ITO and the insulating film made of polyimide and arranged on the conductive films. The first base is provided at the other surface with the black light absorbing layer. Ultraviolet-curing resin monomer R-128H (manufactured by Nippon Kayaku Co., Ltd.) is applied to the insulating film on the first base.

Then, three kinds of liquid crystal materials, which exhibit cholesteric characteristic, are prepared. These three kinds of liquid crystal materials are mixtures of nematic liquid crystal material MN1000XX (manufactured by Chisso Co., Ltd., Δn=0.219 (λ=589 nm), $T_{N-I}$=69.9° C.) and chiral ingredient S-811 (manufactured by Merck Co., Ltd.) added thereto at rates of 38.6%, 31.0% and 24.0% by weight with respect to the whole weight, respectively. These liquid crystal materials have the selective reflection wavelengths of 480 nm, 570 nm and 700 nm, and exhibit blue, green and red appearances, respectively. Droplets of these liquid crystal materials are successively applied onto the surface coated with the resin monomer from an injection needle. These droplets are applied to positions corresponding to the pixels, respectively, which are defined by the conductive films (electrode) on the first base and the conductive films (electrode), which will be described later and are arranged on the second base. These three kinds of liquid crystal droplets are applied to each position where the pixel for multi-color display can be formed by these three kinds of liquid crystal regions. Each droplet of the liquid crystal material, which is individually applied, is 0.65 micro-liter in volume, and therefore has a diameter of about 500 μm.

Then, the second base (plate) made of glass is placed on the resin monomer and the liquid crystal material. The second base is provided with the large number of line-like conductive films made of ITO and extending perpendicularly to the line-like conductive films arranged on the first base, and is also provided with the insulating film made of polyimide and arranged on the conductive films. Spacer particles each having a diameter of 10 μm are dispersed on the insulating film. The second base is laid on the resin monomer and the liquid crystal material with the conductive films directed inward, and thereby the resin monomer and the liquid crystal material are held between the first and second bases. Ultraviolet light is emitted to the whole surface of the second base at a rate of 15 mw/cm² for one minute so that the resin monomer is cured. The liquid crystal device produced in the above method has the composite layer, in which the liquid crystal materials are arranged in positions corresponding to the respective pixels, and the resin partition is formed in the other, i.e., non-display regions.

This liquid crystal device becomes transparent and exhibits the black background color when each pixel attains the focal conic orientation due to application of the pulse voltage of 50 V and 10 msec to the pixel. When a pulse voltage of 100 V and 10 msec is applied, it exhibits a blue, green or red appearance as a result of selective reflection by the planar orientation. In each pixel for multi-color display formed of the three kinds of liquid crystal regions, each of the three regions is appropriately set to the planar or focal conic orientation, whereby the multi-color display in eight colors can be performed, more specifically eight colors including black, which is performed when all the regions are in the focal conic orientation and thus the background color is displayed, and the combination color of red, green, and blue, which is performed when these regions are selectively or entirely in the planar orientation.

In this liquid crystal device, it was also found that neighboring liquid crystal regions are not gradually mixed together because the liquid crystal regions are completely separated from each other by the resin partition. Since the liquid crystal material and the resin monomer used in this device are not compatible at a room temperature, the liquid crystal regions and the resin partition can be precisely formed in the predetermined positions.

PRACTICAL EXAMPLE 3

The first base (plate) which is made of glass and has sizes of 100 mm by 100 mm is prepared. The first base is provided at one of its surfaces with the large number of line-like parallel conductive films made of ITO and the insulating film made of polyimide and arranged on the conductive films. The first base is provided at the other surface with the black light absorbing layer. Then, droplets of the liquid crystal material, which exhibit cholesteric characteristic and is made of a mixture of the nematic liquid crystal material MN1000XX (manufactured by Chisso Co., Ltd., Δn=0.219 (λ=589 nm), $T_{N-I}$=69.9° C.) and the chiral ingredient S-811 (manufactured by Merck Co., Ltd.) added thereto at a rate of 31.0% by weight with respect to the whole weight, are successively applied onto the insulating film on the first base from an injection needle. These droplets are applied to positions corresponding to the pixels, respectively, which are defined by the conductive films on the first base and the conductive films, which will be described later and are arranged on the second base.

Droplets of the ultraviolet-curing resin monomer R-128H (manufactured by Nippon Kayaku Co., Ltd.) are successively applied to the positions on the insulating film corresponding to the other and thus non-display regions from an injection needle, respectively.

This liquid crystal material has the selective reflection wavelength of 570 nm, and can exhibit a green appearance. Each droplet of the resin monomer and the liquid crystal material, which is individually applied, is 0.65 micro-liter in volume, and therefore has a diameter of about 500 $\mu$m.

Then, the second base (plate) made of glass is placed on the resin monomer and the liquid crystal material. The second base is provided with the large number of line-like conductive films made of ITO and extending perpendicularly to the line-like conductive films arranged on the first base, and is also provided with the insulating film made of polyimide and arranged on the conductive films. Spacer particles each having a diameter of 10 $\mu$m are dispersed on the insulating film. The second base is laid on the resin monomer and the liquid crystal material with the conductive films directed inward, and thereby the resin monomer and the liquid crystal material are held between the first and second bases. Ultraviolet light is emitted to the whole surface of the second base at a rate of 15 mw/cm$^2$ for one minute so that the resin monomer is cured. The liquid crystal device produced in the above method has the composite layer, in which the liquid crystal materials are arranged in positions corresponding to the pixels defined by the conductive films on the first and second bases, respectively, and the resin partition is formed in the other, i.e., non-display regions.

This liquid crystal device becomes transparent and exhibits the black background color when the focal conic orientation is attained due to application of the pulse voltage of 50 V and 10 msec. When a pulse voltage of 100 V and 10 msec is applied, it exhibits a green appearance as a result of selective reflection by the planar orientation. These states are held even after stop of voltage application, and bistability is exhibited.

In this liquid crystal device, it was found that neighboring liquid crystal regions are not gradually mixed together because the liquid crystal regions are completely separated from each other by the resin partition. Since the liquid crystal material and the resin monomer used in this device are not compatible at a room temperature, the liquid crystal regions and the resin partition can be precisely formed in the predetermined positions.

PRACTICAL EXAMPLE 4

Three kinds of liquid crystal materials, which exhibit cholesteric characteristic, are prepared. These three kinds of liquid crystal materials are mixtures of the nematic liquid crystal material MN1000XX (manufactured by Chisso Co., Ltd., $\Delta$n=0.219 ($\lambda$=589 nm), $T_{N-I}$=69.9° C.) and the chiral ingredient S-811 (manufactured by Merck Co., Ltd.) added thereto at rates of 38.6%, 31.0% and 24.0% by weight with respect to the whole weight, respectively. These liquid crystal materials have the selective reflection wavelengths of 480 nm, 570 nm and 700 nm, and exhibit blue, green and red appearances, respectively.

The first base (plate) which is made of glass and has sizes of 100 mm by 100 mm is prepared. The first base is provided at one of its surfaces with the large number of line-like parallel conductive films made of ITO and the insulating film made of polyimide and arranged on the conductive films. The first base is provided at the other surface with the black light absorbing layer. Droplets of the above three kinds of liquid crystal materials are successively applied onto the insulating film on the first base from an injection needle. These droplets are applied to positions corresponding to the pixels, respectively, which are defined by the conductive films on the first base and the conductive films (electrode), which will be described later and are arranged on the second base. These three kinds of liquid crystal droplets are applied to each position where the pixel for multi-color display can be formed by these three kinds of liquid crystal regions.

Droplets of the ultraviolet-curing resin monomer R-128H (manufactured by Nippon Kayaku Co., Ltd.) are successively applied to the positions on the insulating film corresponding to the other and thus non-display regions from an injection needle, respectively. Each droplet of the resin monomer and the liquid crystal material, which is individually applied, is 0.65 micro-liter in volume, and therefore has a diameter of about 500 $\mu$m.

Then, the second base (plate) made of glass is placed on the resin monomer and the liquid crystal material. The second base is provided with the large number of line-like conductive films made of ITO and extending perpendicularly to the line-like conductive films arranged on the first base, and is also provided with the insulating film made of polyimide and arranged on the conductive films. Spacer particles each having a diameter of 10 $\mu$m are dispersed on the insulating film. The second base (plate) is laid on the resin monomer and the liquid crystal material with the conductive films directed inward, and thereby the resin monomer and the liquid crystal material are held between the first and second plates. Ultraviolet light is emitted to the whole surface of the second plate at a rate of 15 mw/cm$^2$ for one minute so that the resin monomer is cured. The liquid crystal device produced in the above method has the composite layer, in which the liquid crystal materials are arranged in positions corresponding to the respective pixels, and the resin partition is formed in the other, i.e., non-display regions.

This liquid crystal device becomes transparent and exhibits the black background color when each pixel attains the focal conic orientation due to application of the pulse voltage of 50 V and 10 msec to the pixel. When a pulse voltage of 100 V and 10 msec is applied, it exhibits a blue, green or red appearance as a result of selective reflection by the planar orientation. In each pixel for multi-color display formed of the three kinds of liquid crystal regions, each of the three regions is appropriately set to the planar or focal conic orientation, whereby the multi-color display in eight colors can be performed, more spacifically eight colors including black which is performed when all the regions are in the focal conic orientation and thus the background color is displayed, and the combination color of red, green, and blue, which is performed when these regions are selectively or entirely in the planar orientation.

In this liquid crystal device, it was also found that neighboring liquid crystal regions are not gradually mixed together because the liquid crystal regions are completely separated from each other by the resin partition. Since the liquid crystal material and the resin monomer used in this device are not compatible at a room temperature, the liquid crystal regions and the resin partition can be precisely formed in the predetermined positions.

PRACTICAL EXAMPLE 5

The first base (plate) which is made of glass and has sizes of 1 m by 1 m is prepared. The first base is provided at one of its surfaces with the large number of line-like parallel conductive films made of ITO and the insulating film made of polyimide and arranged on the conductive films. The first base is provided at the other surface with the black light absorbing layer. Then, the ultraviolet-curing resin monomer R-128H (manufactured by Nippon Kayaku Co., Ltd.) is flowed onto one end, in the lengthwise direction of the base, of the insulating film, and is spread in the lengthwise direction of the base by a blade to form a layer of an uniform thickness.

Then, droplets of the liquid crystal material, which exhibits cholesteric characteristic and is made of a mixture of the nematic liquid crystal material MN1000XX (manufactured by Chisso Co., Ltd., $\Delta n=0.219$ ($\lambda=589$ nm), $T_{N\text{-}I}=69.9°$ C.) and the chiral ingredient S-811 (manufactured by Merck Co., Ltd.) added thereto at a rate of 31.0% by weight with respect to the whole weight, are successively applied onto the portions already coated with the resin monomer. These droplets are applied to positions corresponding to the pixels, respectively, which are defined by the conductive films on the first base and the conductive films, which will be described later and are arranged on the second base. This liquid crystal material has the selective reflection wavelength of 570 nm, and can exhibit a green appearance. Each droplet of the liquid crystal material, which is individually applied, is 0.65 micro-liter in volume, and therefore has a diameter of about 500 $\mu$m.

Then, the film-like second base made of polyethylene terephthalate is successively placed on the portions onto which the liquid crystal droplets are already applied. The second base is provided with the large number of line-like conductive films made of ITO and extending perpendicularly to the line-like conductive films arranged on the first base, and is also provided with the insulating film made of polyimide and arranged on the conductive films. Spacer particles each having a diameter of 10 $\mu$m are dispersed on the insulating film. The second base is laid on the resin monomer and the liquid crystal material with the conductive films directed inward, and thereby the resin monomer and the liquid crystal material are held between the first and second bases.

The portions to which the film-like second base is already applied are successively moved through the space between the paired rollers carrying an appropriate load so that the thickness of the assembly of the paired bases is made uniform.

Portions of the base assembly, which passed through the roller pair, are successively radiated with ultraviolet light, which is emitted to the film-like second base at a rate of 15 raw/cm$^2$ for one minute, so that the resin monomer is cured. The liquid crystal device produced in the above method has the composite layer, in which the liquid crystal materials are arranged in positions corresponding to the pixels defined by the conductive films on the first and second bases, respectively, and the resin partition is formed in the other, i.e., non-display regions.

The above respective steps are performed by successively moving the first base through predetermined positions in which the nozzle of the resin monomer reservoir, the blade, the injection needle of the liquid crystal reservoir, the film supply device, the roller pair and the ultraviolet lamp are arranged, respectively.

This liquid crystal device becomes transparent and exhibits the black background color when the focal conic orientation is attained due to application of the pulse voltage of 50 V and 10 msec. When a pulse voltage of 100 V and 10 msec is applied, it exhibits a green appearance as a result of selective reflection by the planar orientation. These states are held even after stopping voltage application, and bistability is exhibited.

In this liquid crystal device, it was found that neighboring liquid crystal regions are not gradually mixed together because the liquid crystal regions are completely separated from each other by the resin partition. Since the liquid crystal material and the resin monomer used in this device are not compatible at a room temperature, the liquid crystal regions and the resin partition can be precisely formed in the predetermined positions.

Since the second base is formed of the flexible film, the size of the producible liquid crystal device can be increased without increasing the whole size of the manufacturing apparatus.

PRACTICAL EXAMPLE 6

The first base (plate) which is made of glass and has sizes of 1 m by 1 m is prepared. The first base is provided at one of its surfaces with the large number of line-like parallel conductive films made of ITO and the insulating film made of polyimide and arranged on the conductive films. The first base is provided at the other surface with the black light absorbing layer.

Three kinds of liquid crystal materials, which exhibit cholesteric characteristic, are prepared. These three kinds of liquid crystal materials are mixtures of the nematic liquid crystal material MN1000XX (manufactured by Chisso Co., Ltd., $\Delta n=0.219$ ($\lambda=589$ nm), $T_{N\text{-}I}=69.9°$ C.) and the chiral ingredient S-811 (manufactured by Merck Co., Ltd.) added thereto at rates of 38.6%, 31.0% and 24.0% by weight with respect to the whole weight, respectively. These liquid crystal materials have the selective reflection wavelengths of 480 nm, 570 nm and 700 nm, and exhibit blue, green and red appearances, respectively.

Then, the ultraviolet-curing resin monomer R-128H (manufactured by Nippon Kayaku Co., Ltd.) is flowed onto one end, in the lengthwise direction of the first base, of the insulating film, and is spread in the lengthwise direction of the base by a blade to form a layer having an uniform thickness.

Droplets of the above three kinds of liquid crystal materials are successively applied from the injection needle onto the portions coated with the uniform layer of the resin monomer. These droplets are applied to positions corresponding to the pixels, respectively, which are defined by the conductive films on the first base and the conductive films (electrode), which will be described later and are arranged on the second base. These three kinds of liquid crystal droplets are applied to each position where the pixel for multi-color display can be formed by these three kinds of liquid crystal regions. Each of the droplets of the liquid crystal materials, which is individually applied, is 0.65 micro-liter in volume, and therefore has a diameter of about 500 $\mu$m.

Then, the film-like second base made of polyethylene terephthalate is successively placed on the portions onto which the liquid crystal droplets are already applied. The second base is provided with the large number of line-like conductive films made of ITO and extending perpendicularly to the line-like conductive films arranged on the first base, and is also provided with the insulating film made of polyimide and arranged on the conductive films. Spacer particles each having a diameter of 10 $\mu$m are dispersed on the insulating film. The second base is laid on the resin monomer and the liquid crystal material with the conductive films directed inward, and thereby the resin monomer and the liquid crystal material are held between the first and second bases.

The portions to which the film-like second base of the base pair is already applied are successively moved through the roller pair carrying an appropriate load so that the thickness of the assembly of the paired bases is made uniform.

Portions of the base assembly, which passed through the roller pair, are successively radiated with ultraviolet light, which is emitted to the film-like second base at a rate of 15 mw/cm$^2$ for one minute, so that the resin monomer is cured. The liquid crystal device produced in the above method has the composite layer, in which the liquid crystal materials are arranged in positions corresponding to the pixels defined by the conductive films on the first and second bases, respectively, and the resin partition is formed in the other, i.e., non-display regions.

The above respective steps are performed by successively moving the first base through predetermined positions in which the nozzle of the resin monomer reservoir, the blade, the injection needle of the liquid crystal reservoir, the film supply device, the roller pair and the ultraviolet lamp are arranged, respectively.

This liquid crystal device becomes transparent and exhibits the black background color when the pixel, which is defined by the first and second bases, attains the focal conic orientation due to application of the pulse voltage of 50 V and 10 msec to the pixel. When a pulse voltage of 100 V and 10 msec is applied, it exhibits a blue, green or red appearance as a result of selective reflection by the planar orientation. In each pixel for multi-color display formed of the three kinds of liquid crystal regions, each of the three regions is appropriately set to the planar or focal conic orientation, whereby the multi-color display in eight colors can be performed, more specifically eight colors including black which is performed when all the regions are in the focal conic orientation and thus the background color is displayed, and the combination color of red, green, and blue, which is co performed when these regions are selectively or entirely in the planar orientation.

Since the second base is formed of the flexible film, the size of the producible liquid crystal device can be increased without increasing the whole size of the manufacturing apparatus.

In this liquid crystal device, it was also found that neighboring liquid crystal regions are not gradually mixed together because the liquid crystal regions are completely separated from each other by the resin partition. Since the liquid crystal material and the resin monomer used in this device are not compatible at a room temperature, the liquid crystal regions and the resin partition can be precisely formed in the predetermined positions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of making a liquid crystal device having a plurality of cells of liquid crystal material, comprising the steps of:
   (a) preparing a first base having a first surface;
   (b) providing, in an area within which said plurality of cells are to be formed, a first phase of a resin partition material and a plurality of second phases of at least one liquid crystal material on said first surface, said plurality of second phases being spatially dispersed in a first prescribed pattern within the first phase of the resin partition material, the first phase of the resin partition material being nonsolidified; and
   (c) solidifying said first phase of said resin partition material.

2. A method according to claim 1, further comprising the step of (d) providing a second base having a second surface, said second surface being substantially in contact with said first phase and said plurality of second phases.

3. A method according to claim 2, wherein said step (d) is executed after said step (b) and before said step (c).

4. A method according to claim 2, wherein said first and said second bases are provided with electrodes in a matrix pattern.

5. A method according to claim 4, wherein said plurality of second phases is disposed at positions corresponding to pixels defined by locations of said electrodes during said step (b) so that a partition is formed by solidifying said first phase material in a non-display region during said step (c).

6. A method according to claim 1, wherein said resin partition material of said first phase is a pre-polymer material, and polymerization of said pre-polymer material is executed in said step (c).

7. A method according to claim 6, wherein said polymerization is executed by exposing said pre-polymer material to ultraviolet rays.

8. A method according to claim 6, wherein said polymerization is executed by heating said prepolymer material.

9. A method according to claim 1, wherein said liquid crystal material of said plurality of second phases is a liquid crystal material which exhibits a cholesteric characteristic.

10. A method according to claim 9, wherein said liquid crystal material is a material selected from the group consisting of a nematic liquid crystal material and a chiral material.

11. A method according to claim 1, wherein the resin partition material of said first phase does not dissolve in said at least one liquid crystal material of said plurality of second phases.

12. A method according to claim 1, wherein said step (b) includes the steps of:
   (b1) dispersing the resin partition material of said first phase on said first surface of the first base in a second prescribed pattern; and
   (b2) dispersing the at least one liquid crystal material of said plurality of second phases on said first surface in said first prescribed pattern.

13. A method according to claim 12, wherein said step (b) is executed by dropping a plurality of droplets of said resin partition material, and by dropping a plurality of droplets of said liquid crystal material.

14. A method according to claim 13, wherein an ink jet head is used for dropping said droplets.

15. A method according to claim 13, wherein each of said plurality of droplets has a diameter of 500 $\mu$m or less.

16. A method of making a liquid crystal device having a plurality of cells of liquid crystal material, comprising the steps of:
   (a) preparing a first base having a first surface;
   (b) providing a first phase of a resin partition material and a plurality of second phases of at least one liquid crystal material on said first surface, said plurality of second phases being spatially dispersed in a first prescribed pattern; and
   (c) solidifying said first phase of said resin partition material, wherein said plurality of second phases includes a first group of the second phases and a second group of the second phases, each of said second phases in said first group including a first liquid crystal material, and each of said second phases in said second group including a second liquid crystal material which is different from said first liquid crystal material.

17. A method according to claim 16, wherein said first and said second liquid crystal materials are liquid crystal materials which exhibit a cholesteric characteristic.

18. A method according to claim 17, wherein said first liquid crystal material, when in a planar state, reflects light of a first wavelength, and said second liquid crystal material, when in a planar state, reflects light of a second wavelength which is different from said first wavelength.

19. A method according to claim 18, wherein light of said first and said second wavelengths are each visible light.

20. A method of making a liquid crystal device having a plurality of cells of liquid crystal material, comprising the steps of:
    (a) preparing a first base having a first surface;
    (b) providing a first phase of a resin partition material and a plurality of second phases of at least one liquid crystal material on said first surface, said plurality of second phases being spatially dispersed in a first prescribed pattern;
    (c) solidifying said first phase of said resin partition material; and
    (d) providing a second base having a second surface, said second surface being substantially in contact with said first phase and said plurality of second phases,
    wherein one of said first and said second bases is a transparent base, and the other of said first and said second bases is an opaque base provided with a black, light absorbing layer,
    wherein said step (b) includes the steps of:
        spreading the resin partition material of the first phase uniformly on the surface of the first base; and
        dispersing the liquid crystal material of the plurality of second phases on the first phase.

21. A method of making a liquid crystal device having a plurality of cells of liquid crystal material, comprising the steps of:
    (a) preparing a first base having a first surface;
    (b) providing a first phase of a resin partition material and a plurality of second phases of at least one liquid crystal material on said first surface, said plurality of second phases being spatially dispersed in a first prescribed pattern; and
    (c) solidifying said first phase of said resin partition material,
    wherein a black coloring agent is mixed into said first phase in said step (b) so that the portion formed in said step (c) absorbs light and exhibits a black appearance,
    wherein said step (b) includes the steps of:
    spreading the resin partition material of the first phase uniformly on the surface of the first base; and
    dispersing the liquid crystal material of the plurality of second phases on the first phase.

22. A method of making a liquid crystal device having a plurality of cells of liquid crystal material, comprising the steps of:
    (a) preparing a first base having a first surface;
    (b) providing a first phase of a resin partition material and a plurality of second phases of at least one liquid crystal material on said first surface, said plurality of second phases being spatially dispersed in a first prescribed pattern; and
    (c) solidifying said first phase of said resin partition material,
    wherein said step (b) includes the steps of:
        (b1) spreading the resin partition material of said first phase uniformly on said surface of the first base; and
        (b2) dispersing the liquid crystal material of said plurality of second phases on said first phase.

23. A method according to claim 22, wherein said step (b2) is executed by dropping a plurality of droplets of said liquid crystal material.

24. A method according to claim 23, wherein an ink jet head is used for dropping said plurality of droplets of the liquid crystal material.

25. A method according to claim 23, wherein each of said plurality of droplets of the liquid crystal material has a diameter of 500 $\mu$m or less.

26. A method of forming a pillar between two liquid crystal cells, comprising the steps of:
    (a) preparing a first base having a first surface;
    (b) providing a first droplet of a liquid crystal material on a first position on the first surface, and a second droplet of the liquid crystal material on a second position on the first surface, the first position spaced from the second position, and providing a resin partition material on at least a third position between said first and second positions; and
    (c) solidifying said resin partition material to form a pillar.

27. A method according to claim 26, further comprising the step of:
    (d) providing a second base having a second surface, said second surface being substantially in contact with said two droplets of the liquid crystal material and said resin partition material.

28. A method according to claim 27, wherein said step (d) is executed after said step (b) and before said step (c).

29. A method according to claim 27, wherein said first and said second bases are provided with electrodes in a matrix pattern.

30. A method according to claim 29, wherein said first position corresponds to a first pixel, defined by said electrodes, during said step (b), and said second position corresponds to a second pixel neighboring said first pixel so that said pillar is formed during said step (c) in a non-display region corresponding to the portion between said first and said second pixels.

31. A method according to claim 27, wherein one of said first and said second bases is a transparent base, and the other of said first and said second bases is an opaque base provided with a black, light absorbing layer.

32. A method according to claim 26, wherein said resin partition material is a pre-polymer material, and polymerization of said pre-polymer material is performed during said step (c).

33. A method according to claim 32, wherein said polymerization is executed by exposing said pre-polymer material to ultraviolet rays.

34. A method according to claim 32, wherein said polymerization is executed by heating said pre-polymer material.

35. A method according to claim 26, wherein said liquid crystal material is a liquid crystal material which exhibits a cholesteric characteristic.

36. A method according to claim 35, wherein said liquid crystal material is a material selected from the group consisting of a nematic liquid crystal material and a chiral material.

37. A method according to claim 26, wherein the first droplet of the liquid crystal material comprises a first liquid crystal material and the second droplet of the liquid crystal material comprises a second liquid crystal material, wherein said first and said second liquid crystal materials have different characteristics from each other.

38. A method according to claim 37, wherein said first and said second liquid crystal materials are liquid crystal materials which exhibit a cholesteric characteristic.

39. A method according to claim 38, wherein said first liquid crystal material, when in a planar state, reflects light of a first wavelength, and said second liquid crystal material, when in a planar state, reflects light of a second wavelength which is different from said first wavelength.

40. A method according to claim 38, wherein light of said first wavelength and light of said second wavelength are each visible light.

41. A method according to claim 26, wherein a black coloring agent is mixed into said resin partition material in said step (b) so that the pillar formed in said step (c) absorbs light and exhibits a black appearance.

42. A method according to claim 26, wherein said resin partition material does not dissolve in said liquid crystal material.

43. A method according to claim 26, wherein said step (b) includes the steps of:
(b1) providing a layer of the resin partition material;
(b2) dropping the first droplet of the liquid crystal material at the first position on said layer of the resin partition material; and
(b3) dropping the second droplet of the liquid crystal material at the second position on said layer of the resin partition material.

44. A method according to claim 43, wherein an ink jet head is used for dropping said two droplets of the liquid crystal material.

45. A method according to claim 43, wherein each of said two droplets of the liquid crystal material has a diameter of 500 µm or less.

46. A method according to claim 26, wherein said step (b) includes the steps of:

(b1) dropping the first droplet of the liquid crystal material at the first position on said first surface;
(b2) dropping the second droplet of the liquid crystal material at the second position on said first surface spaced apart from said first position; and
(b3) dropping a droplet of the resin partition material at the third position on said surface which is between said first and said second positions.

47. A method according to claim 46, wherein an ink jet head is used for dropping said two droplets of the liquid crystal material and said droplet of the resin partition material.

48. A method according to claim 46, wherein each of said two droplets has a diameter of 500 µm or less.

49. A method for manufacturing a liquid crystal display having a plurality of pixels, said method comprising the steps of:
providing, on a first surface of a first substrate, a plurality of droplets of an unsolidified resin material at positions each of which is to be a non-display region located between neighboring ones of said pixels;
providing a second substrate on said first surface of said first substrate, thereby sandwiching said droplets by said first and second substrates;
solidifying the thus sandwiched droplets at said positions; and
providing liquid crystal material at least at a position which is to be one of said pixels.

50. A method as claimed in claim 49, wherein said step of providing liquid crystal material includes providing said liquid crystal material between said first and second substrates before the solidification of the sandwiched droplets.

51. A method as claimed in claim 50, wherein said unsolidified resin material has no compatibility with said liquid crystal material at a prescribed temperature.

52. A method as claimed in claim 49, wherein the step of providing liquid crystal material is performed before the step of providing the second substrate on the first surface of the first substrate.

* * * * *